(12) United States Patent
Riviello et al.

(10) Patent No.: US 12,222,789 B2
(45) Date of Patent: Feb. 11, 2025

(54) METHODS FOR PRIORITIZING USAGE OF CENTRAL DEVICES FOR LOCATING PERIPHERAL DEVICES

(71) Applicant: Comcast Cable Communications, LLC, Philadelphia, PA (US)

(72) Inventors: John Riviello, Voorhees, NJ (US); Stephen Allinson, Fairless Hills, PA (US); Jacob Gladish, Blue Bell, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 114 days.

(21) Appl. No.: 17/147,108

(22) Filed: Jan. 12, 2021

(65) Prior Publication Data

US 2022/0221924 A1    Jul. 14, 2022

(51) Int. Cl.
| | |
|---|---|
| *G06F 1/32* | (2019.01) |
| *G06F 1/3212* | (2019.01) |
| *G06F 1/329* | (2019.01) |
| *G06F 9/50* | (2006.01) |
| *H04W 4/02* | (2018.01) |

(52) U.S. Cl.
CPC ........... *G06F 1/3212* (2013.01); *G06F 1/329* (2013.01); *G06F 9/505* (2013.01); *H04W 4/02* (2013.01)

(58) Field of Classification Search
CPC ........ G06F 1/3212; G06F 1/329; G06F 9/505; G06F 2209/5021; G06F 2209/508; G06F 9/5011; G06F 21/88; G06F 2221/2111; H04W 4/21; H04W 4/023; H04W 4/029; H04W 92/18; H04W 4/80; H04W 52/0209; H04W 84/12; H04W 4/02; H04L 67/306; H04L 67/55; Y02D 30/70
See application file for complete search history.

(56) References Cited

U.S. PATENT DOCUMENTS

| | | | |
|---|---|---|---|
| 9,076,119 B2* | 7/2015 | Jain | G06K 7/10207 |
| 2007/0057057 A1* | 3/2007 | Andresky | G06K 7/10356 |
| | | | 340/10.1 |
| 2007/0257798 A1* | 11/2007 | Ford | B65C 9/1884 |
| | | | 340/572.1 |
| 2008/0136639 A1* | 6/2008 | Deoalikar | G06K 7/10435 |
| | | | 340/572.1 |
| 2009/0101712 A1* | 4/2009 | Ulrich | H01Q 1/2208 |
| | | | 235/383 |
| 2009/0102675 A1* | 4/2009 | Arteaga | H04L 67/12 |
| | | | 340/670 |
| 2012/0119883 A1* | 5/2012 | Bekritsky | G06K 7/10356 |
| | | | 340/10.5 |
| 2013/0120119 A1* | 5/2013 | Calvarese | G06K 7/10217 |
| | | | 340/10.5 |

(Continued)

*Primary Examiner* — Danny Chan
(74) *Attorney, Agent, or Firm* — Banner & Witcoff, Ltd.

(57) ABSTRACT

Systems, apparatuses, and methods are described for prioritized usage of central devices for supporting peripheral devices. Central devices may be present in the surrounding area of a peripheral device. Priorities of the central devices for supporting the peripheral device may be determined based on one or more factors associated with the central devices. The manner in which the central devices are used to support the peripheral device may be determined based on the priorities. The prioritized usage of central devices for the peripheral device may be dynamically updated.

23 Claims, 10 Drawing Sheets

(56) References Cited

U.S. PATENT DOCUMENTS

| | | | |
|---|---|---|---|
| 2013/0233922 A1* | 9/2013 | Schoening | G06Q 10/063114 |
| | | | 235/385 |
| 2013/0281110 A1* | 10/2013 | Zelinka | H04W 4/20 |
| | | | 455/456.1 |
| 2018/0247092 A1* | 8/2018 | Khojastepour | G06K 7/10069 |
| 2020/0113518 A1* | 4/2020 | Mollohan | G06F 1/163 |
| 2020/0189844 A1* | 6/2020 | Sridhar | G06Q 30/0226 |
| 2020/0245097 A1* | 7/2020 | Stackpole | H04W 4/023 |
| 2020/0292348 A1* | 9/2020 | Chambers | G06F 30/10 |
| 2021/0211902 A1* | 7/2021 | Achyuth | H04W 92/18 |

* cited by examiner

METHODS FOR PRIORITIZING USAGE OF CENTRAL DEVICES FOR LOCATING PERIPHERAL DEVICES

BACKGROUND

A peripheral device may communicate with one or more central devices for supporting the function(s) of the peripheral device. In the surrounding environment of the peripheral device, a number of central devices may be present, which may have different configurations, such as different types of energy sources. If the number of central devices is more than what is to be used to support the peripheral device, inefficient usage of the central devices for supporting the peripheral device may contribute to degraded performance of central devices and/or compromised user experience.

SUMMARY

The following summary presents a simplified summary of certain features. The summary is not an extensive overview and is not intended to identify key or critical elements.

Systems, apparatuses, and methods are described for prioritized usage of central devices for supporting peripheral devices. Central devices may be present in the surrounding area of a peripheral device. Priorities of the central devices for supporting the peripheral device may be determined based on one or more factors associated with the central devices, such as energy source types, reliability levels, and/or computational resource usage rates. Central devices with higher priorities may be used to support the peripheral device, and central devices with lower priorities might not be used to support the peripheral device. The prioritized usage of central devices for the peripheral device may be dynamically updated, as the surrounding environment of the peripheral device changes. The prioritized device usage may contribute to more efficient use of energy, higher performance of the devices, and/or enhanced user experience.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
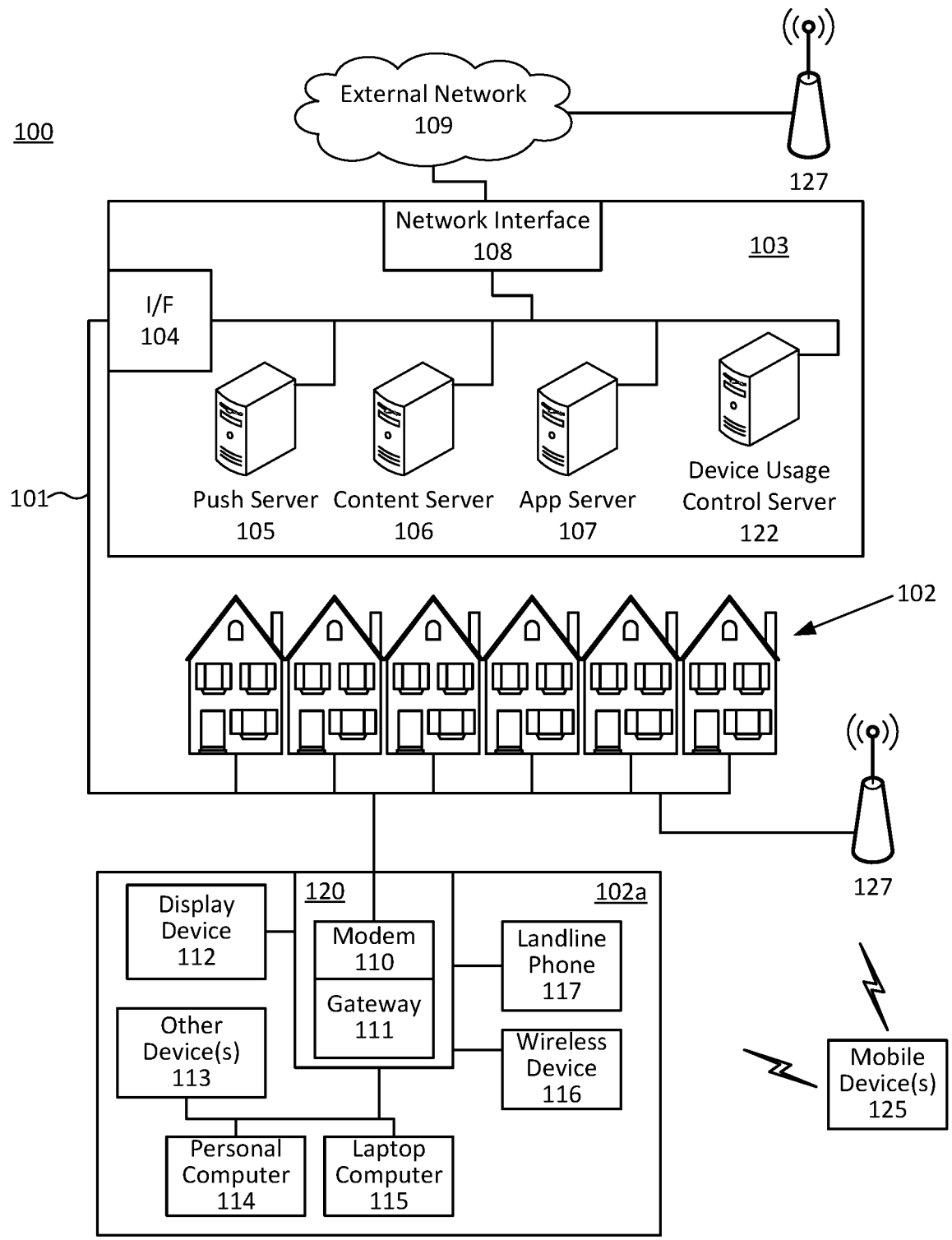
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the device usage control server 122 (described below), additional push, content, and/or application servers, and/or other types of servers. Although shown separately, the push server 105, the content server 106, the application server 107, the device usage control server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein. The device usage control server 122 may, for example, perform operations associated with controlling prioritized usage of central devices for supporting peripheral devices, as discussed below in connection with FIG. 3.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
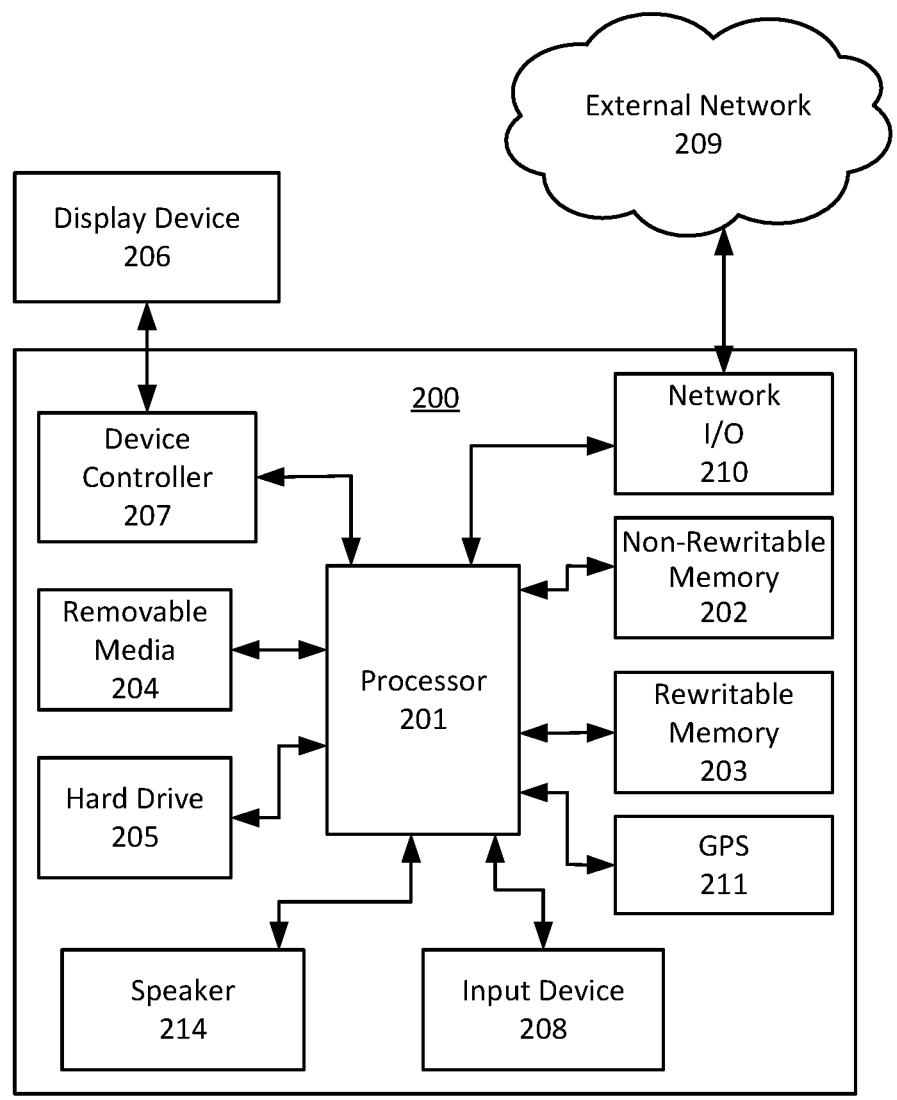
FIG. 2 shows hardware elements of an example computing device.

FIG. 2 shows hardware elements of an example computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the server 301, the central devices 305A-305D, the peripheral devices 307A-307B). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
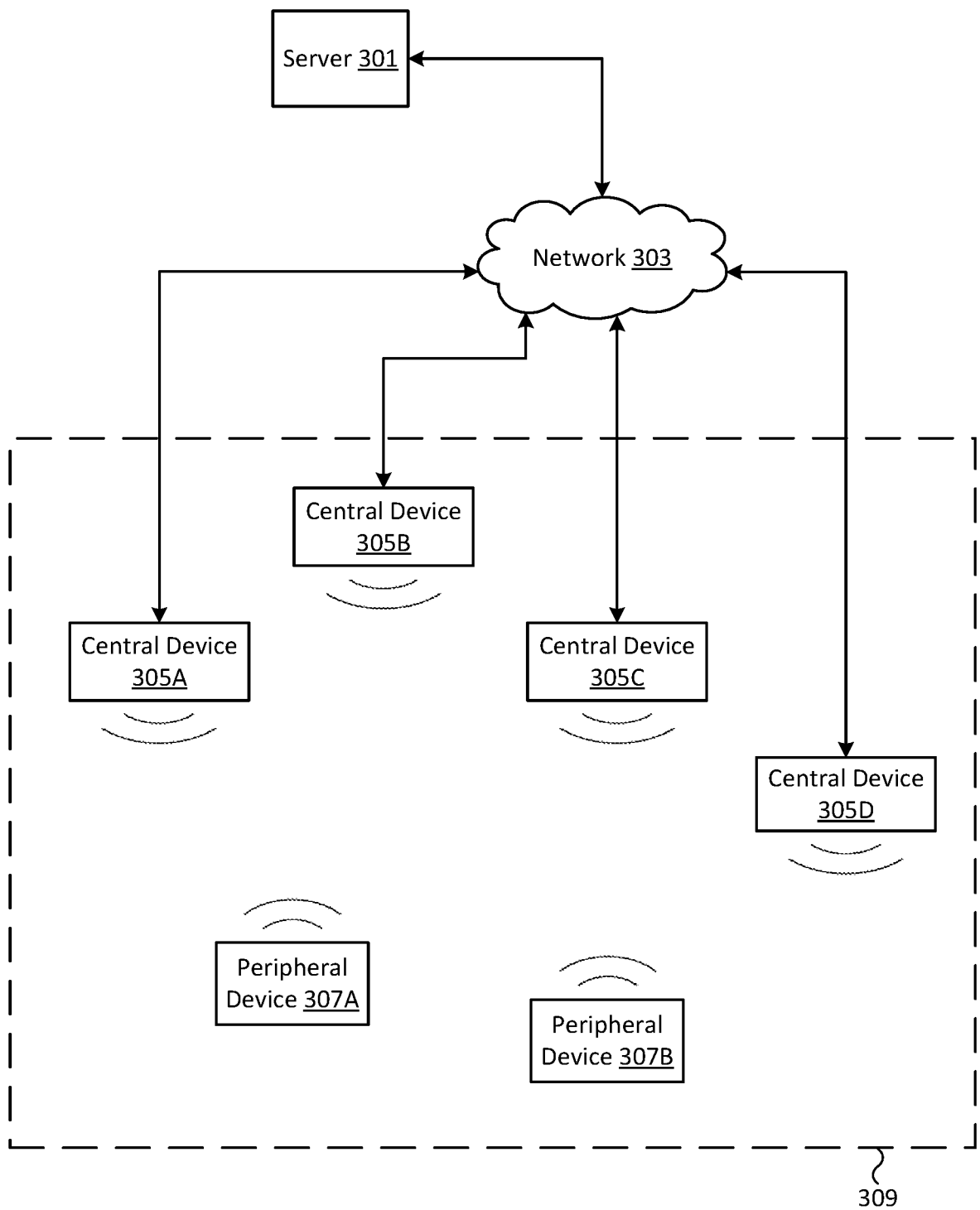
FIG. 3 is a schematic diagram showing an example system for prioritized usage of devices.

FIG. 3 is a schematic diagram showing an example system for prioritized usage of devices. The system may comprise, for example, one or more servers (e.g., server 301), one or more networks (e.g., network 303), one or more central devices (e.g., central devices 305A-305D), and one or more peripheral devices (e.g., peripheral devices 307A-307B). The server 301 may comprise any type of computing device. From a physical standpoint, the server 301 may be implemented as a single device (such as a single server) or as a plurality of devices (such as a plurality of distributed servers). The server 301 may comprise, for example, the device usage control server 122 and/or another server (e.g., a server in the network 109).

The network 303 may comprise a single network or a collection of multiple connected networks. The network 303 may comprise one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The network 303 may comprise a local area network (LAN), a wide area network (WAN), a backbone network, etc. The network 303 may comprise an Internet Protocol (IP) based network (e.g., the Internet). The network 303 may comprise a plurality of interconnected communication links (e.g., to connect the server 301, the central devices 305A-305D, and/or other devices). The network 303 may comprise, for example, the communication links 101 and/or the external network 109 of FIG. 1.

A central device of the central devices 305A-305D may comprise any type of computing device configured to communicate with other devices. A central device of the central devices 305A-305D may comprise, for example, a gateway, a router, a switch, a smartphone, a cell phone, a mobile communication device, a personal computer, a server, a tablet, a desktop computer, a laptop computer, a gaming device, a set-top box, a virtual reality headset, or any other type of computing device. Additionally or alternatively, a central device of the central devices 305A-305D may comprise the interface 120, the modem 110, the gateway 111, the display device 112, the other device 113, the personal computer 114, the laptop computer 115, the wireless device 116, the landline phone 117, and/or the mobile device 125. The central devices 305A-305D may communicate with the server 301 via the network 303. The central devices 305A-305D may additionally or alternatively communicate with each other. A central device (e.g., a smartphone) may communicate with the server 301 via another central device (e.g., a gateway).

A peripheral device of the peripheral devices 307A-307B may comprise any type of computing device configured to communicate with the central devices 305A-305D. A peripheral device of the peripheral devices 307A-307B may comprise, for example, an electronic finder, a key finder, a device configured to help a user find his or her belongings, a smartphone, a cell phone, a mobile communication device, a personal computer, a server, a tablet, a desktop computer, a laptop computer, a gaming device, a virtual reality headset, a device configured to capture images, a camera, an Internet of Things (JOT) sensor, or any other type of computing device.

The central devices 305A-305D and the peripheral devices 307A-307B may be located in a geographic area 309. The geographic area 309 may be of any shape, size, or extent. For example, the geographical area 309 may comprise a building, a room, a space, etc. The geographical area 309 may comprise one or more of the premises 102 and/or their surrounding areas. Additionally or alternatively, the geographical area 309 may comprise indoors, outdoors, underwater space, and/or outer space. The server 301 may be located in a remote location from the geographic area 309. Additionally or alternatively, the server 301 may be located in the geographic area 309.

The peripheral devices 307A-307B may be communicatively coupled to the central devices 305A-305D via any type of communication link. For example, the communication between a peripheral device and a central device, between two peripheral devices, and/or between two central devices may be via Bluetooth communication protocol, Bluetooth Low Energy communication protocol, Zigbee communication protocol, WiFi communication protocol, Universal Plug and Play communication protocol, and/or one or more other (e.g., wireless, radio frequency, etc.) communication protocols, etc.

A peripheral device of the peripheral devices 307A-307B may communicate with one or more of the central devices 305A-305D for various purposes. For example, the peripheral device may communicate with one or more of the central devices 305A-305D to determine a location of the peripheral device. Additionally or alternatively, the peripheral device may request one or more of the central devices 305A-305D to forward a message from the peripheral device to another device, for example, via the network 303. The communication between the peripheral device and the one or more central devices may support the peripheral device to perform its function(s).

Using the central devices 305A-305D to support a peripheral device may cause energy consumption by the central devices 305A-305D. Depending on the function to be performed by the peripheral device, a subset of the central devices 305A-305D may be used (e.g., sufficient and/or necessary) to support the function. For example, one central device may be sufficient to forward a message from a peripheral device to another device. One central device may be sufficient to determine an approximate location of a peripheral device (e.g., to determine that the peripheral device is within a communication range of the central device). Two or more central devices may be used to determine a location of a peripheral device using more accurate techniques, such as triangulation, multilateration, etc.

The central devices 305A-305D may comprise, be powered by, or be associated with different types of energy sources. For example, a first type of energy source for a central device may be duration-limited (e.g., the energy source may be able to supply a finite amount of electrical power until recharged). The first type of energy source may comprise, for example, a battery. A second type of energy source for a central device may be less duration-limited than the first type of energy source. The second type of energy source may comprise, for example, a power line (e.g., power from mains power supplied to a premises, a power line associated with a premises, a power line connectable via a power outlet capable of providing utility power or mains electricity, etc.). The second type of energy source may be interrupted in providing power (e.g., when a power outage or a power blackout happens, when disconnection from the energy source occurs, etc.), but in general it may be considered to be always available and inexhaustible. Additionally or alternatively, a type of energy source of a central device may change from the first type to the second type or change from the second type to the first type, or be a combination of the first type and the second type. For example, a central device with a battery may be connected to a charger, and the central device may thus be associated with both a more duration-limited type of energy source (e.g., the battery) and a less duration-limited energy source (e.g., the charger). If supporting a peripheral device function contributes to significant energy consumption by a central device, and the central device has a more duration-limited energy source (e.g., a battery) rather than a less duration-limited energy source (e.g., a power line), using the central device to support the peripheral device function may contribute to degradation of performance of the central device, and/or compromise of user experience with the central device.

Prioritizing usage of certain central devices for supporting a peripheral device function may help address the challenges discussed above. For example, a subset of a plurality of central devices communicatively coupled to a peripheral device may be selected, if the subset is sufficient to support the peripheral device (and/or a function of the peripheral device). The selection may be based on the types of energy sources of the plurality of central devices. The selection may additionally or alternatively be based on other factors, such as the degrees of reliability of the plurality of central devices or the usage rates of computational resources of the plurality of central devices. For example, if a central device with a more duration-limited energy source (e.g., a battery) and a central device with a less duration-limited energy source (e.g., a power line) are both available to support a peripheral device, and one central device is sufficient to support the peripheral device, the central device with the less duration-limited energy source may be selected for supporting the peripheral device.

A computing device may be configured to manage the prioritization of central devices 305A-305D for supporting a peripheral device, including the selection of a subset of central devices for the peripheral device. The computing device may comprise, for example, the server 301, the central devices 305A-305D, and/or the peripheral devices 307A-307B. For example, if the server 301 is configured to manage the prioritization, the server 301 may receive information associated with the central devices 305A-305D and/or the peripheral device, determine priorities of the central devices 305A-305D based on the information, and instruct the central devices 305A-305D to support the peripheral device according to the determined priorities. If the central devices 305A-305D are configured to manage the prioritization, each of the central devices 305A-305D may obtain information associated with the central devices 305A-305D and/or the peripheral device, determine priorities of the central devices 305A-305D based on the information, and instruct itself to support the peripheral device according to the determined priorities. If a peripheral device is configured to manage the prioritization, the peripheral device may obtain information associated with the central devices 305A-305D and/or the peripheral device, determine priorities of the central devices 305A-305D based on the information, and instruct the central devices 305A-305D to support the peripheral device according to the determined priorities. Additionally or alternatively, a computing device (e.g., one of the server 301, the central devices 305A-305D, and/or the peripheral devices 307A-307B) may be configured to manage the prioritization of central devices for a plurality of peripheral devices.

If one particular peripheral device comprises a plurality of services and/or functions (e.g., a first service to determine the location of the peripheral device and a second service to send a message via a central device to another device), the processes associated with the prioritization of central devices for the peripheral device may be performed on the service and/or function level. For example, a first set of central device(s) may be selected for a first service of the peripheral device and a second set of central device(s) may be selected for a second service of the peripheral device. The first set of central device(s) may be same or different from the second set of central device(s). One or more example methods for prioritized usage of central devices are discussed below in greater detail in connection with FIGS. 4A-4C and 5-8.

Additionally or alternatively, the apparatuses, systems, and/or methods as described herein may be used in connection with WiFi motion detection. The motion of an object may be determined based on analyzing WiFi signals propagating in the surrounding area of the object. For example, the motion of the object may cause changes to the patterns of the WiFi signals. The WiFi signals may be sensed, captured, and/or monitored by one or more WiFi client devices, and the patterns of the WiFi signals may be analyzed (e.g., recognized) for detecting the motion of the object. The peripheral devices 307A-307B may comprise, for example, WiFi client devices configured to receive WiFi signals, such as smartphones, laptops, tablets, and/or the like. The central devices 305A-305D may comprise, for example, WiFi access points, such as routers, gateways, repeaters, mesh pods, and/or the like. The apparatuses, systems, and/or methods as described herein may be used to select a central device for processing (e.g., detecting motion based on) data of WiFi signals as captured by a peripheral device (e.g., if multiple central devices are available to perform such processing for the peripheral device). The selection of the central device may be based on, for example, the computational resources (e.g., the Central Processing Unit, the memory, the network interface) of the central device. For example, the amount of available computational resources of each of the multiple central devices may be determined, and a central device, of the multiple central devices, with the largest amount of available computational resources may be selected for processing the data of WiFi signals captured by the peripheral device and detecting object motion based on the WiFi signals data. The peripheral device may capture WiFi signals (e.g., wireless), and may send data of the captured WiFi signals to the selected central device. The selection of the central device may be based on additional or alternative factors, such as energy source types.

Additionally or alternatively, apparatuses, systems, and/or methods as described herein may be used in connection with camera object detection. Objects may be detected based on images captured by a camera. For example, a camera may capture images, and objects (e.g., humans, buildings, vehicles, etc.) may be detected based on the images. The peripheral devices 307A-307B may comprise, for example, devices configured to capture images, such as cameras and/or the like. The central devices 305A-305D may comprise, for example, computing devices (such as routers, gateways, repeaters, mesh pods, set-top boxes, and/or the like) communicatively coupled to the peripheral devices 307A-307B. Such computing devices may be managed by an operator. The apparatuses, systems, and/or methods as described herein may be used to select a central device for processing (e.g., detecting objects based on) images as captured by a peripheral device (e.g., if multiple central devices are available to perform such processing for the peripheral device). The selection of the central device may be based on, for example, the computational resources (e.g., the Central Processing Unit, the memory, the network interface) of the central device. For example, the amount of available computational resources of each of the multiple central devices may be determined, and a central device, of the multiple central devices, with the largest amount of available computational resources may be selected for processing the images captured by the peripheral device and detecting objects based on the images. The peripheral device may capture images, and may send the captured images to the selected central device. The processing of the images captured by the peripheral device for detecting objects may be shifted and/or offloaded to the selected central device. The selection of the central device may be based on additional or alternative factors, such as energy source types.

Figure 4A:
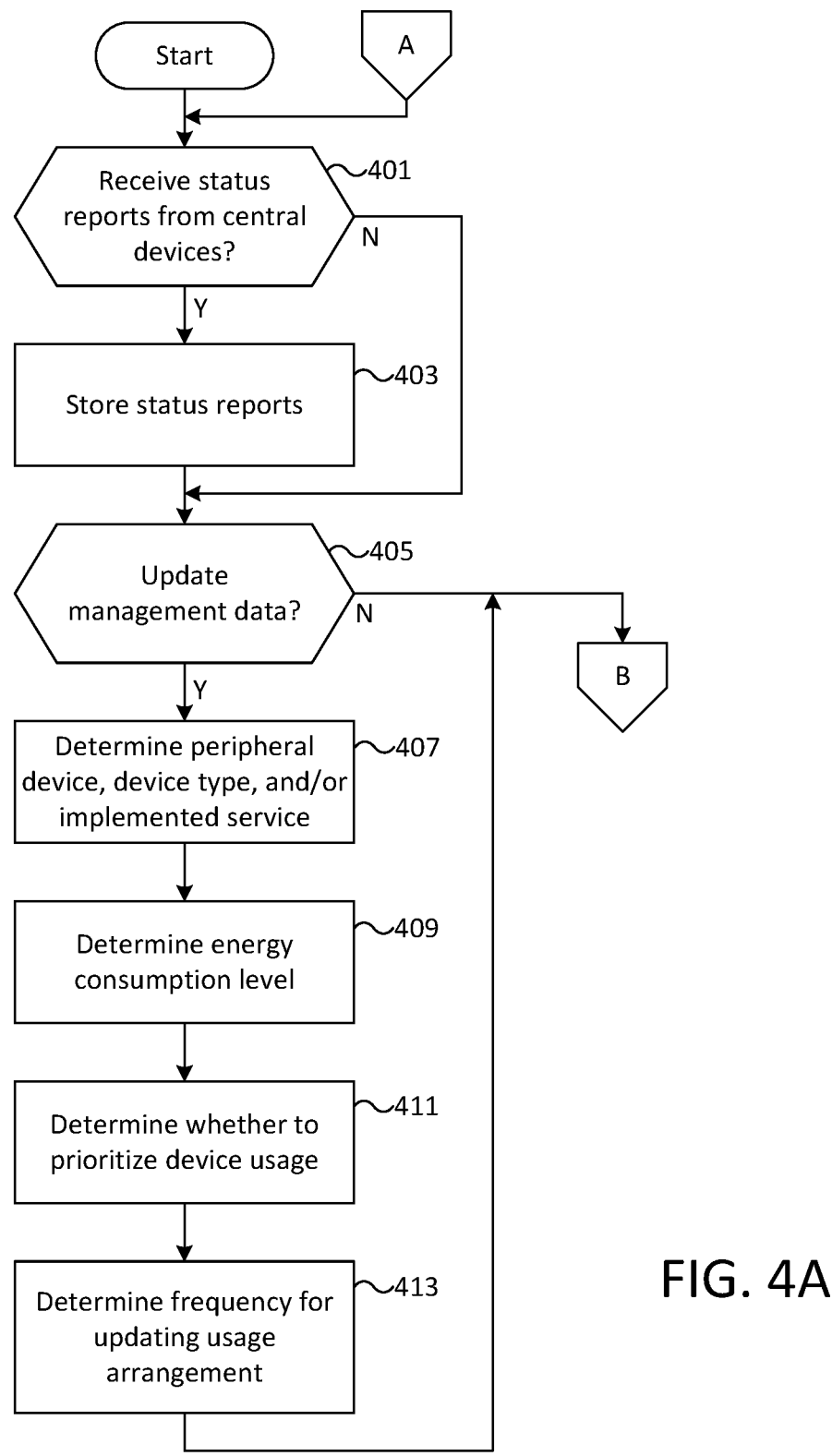
FIGS. 4A-4C show a flowchart of an example method for prioritized usage of devices.
Figure 4B:
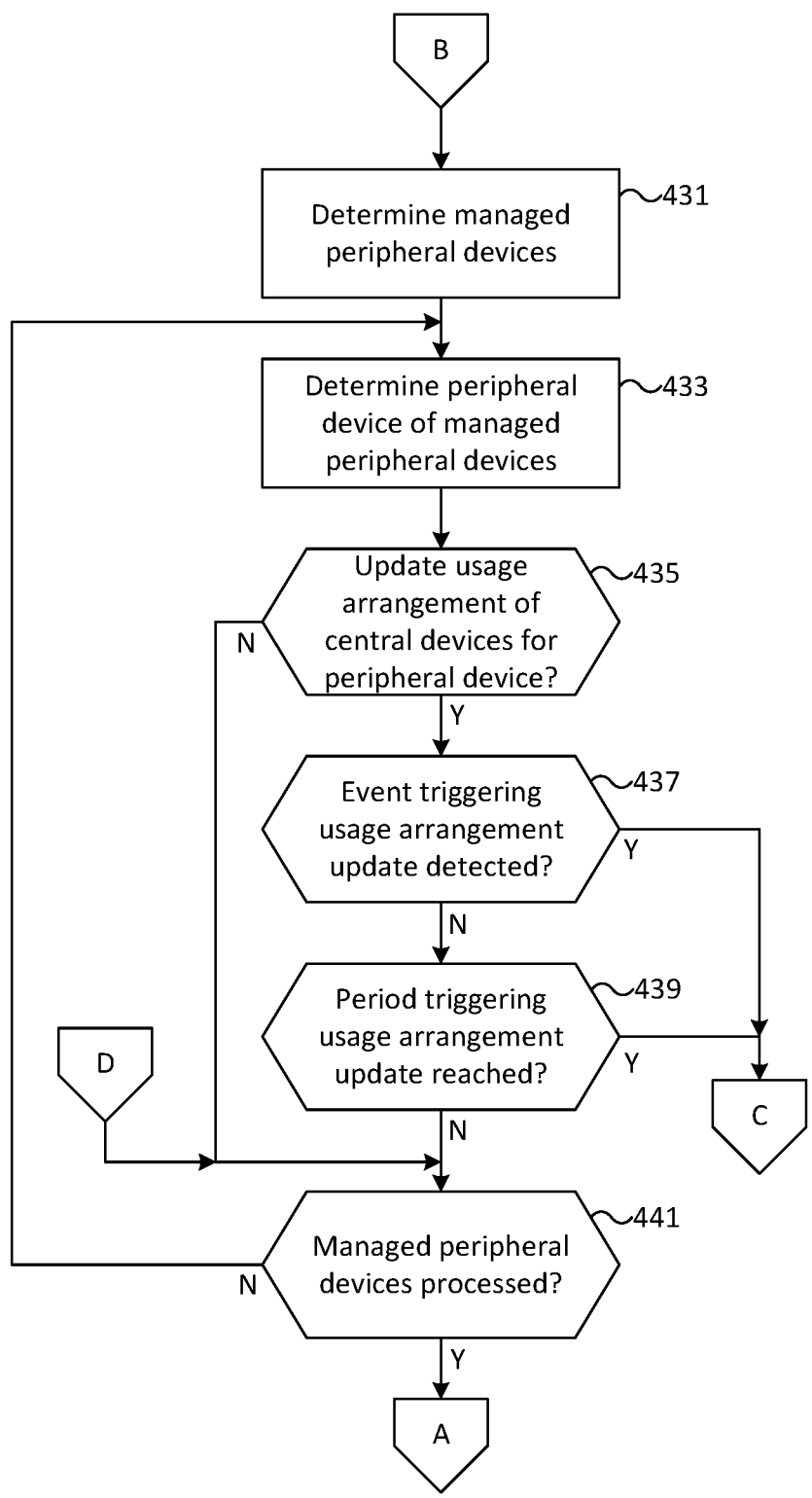
Figure 4C:
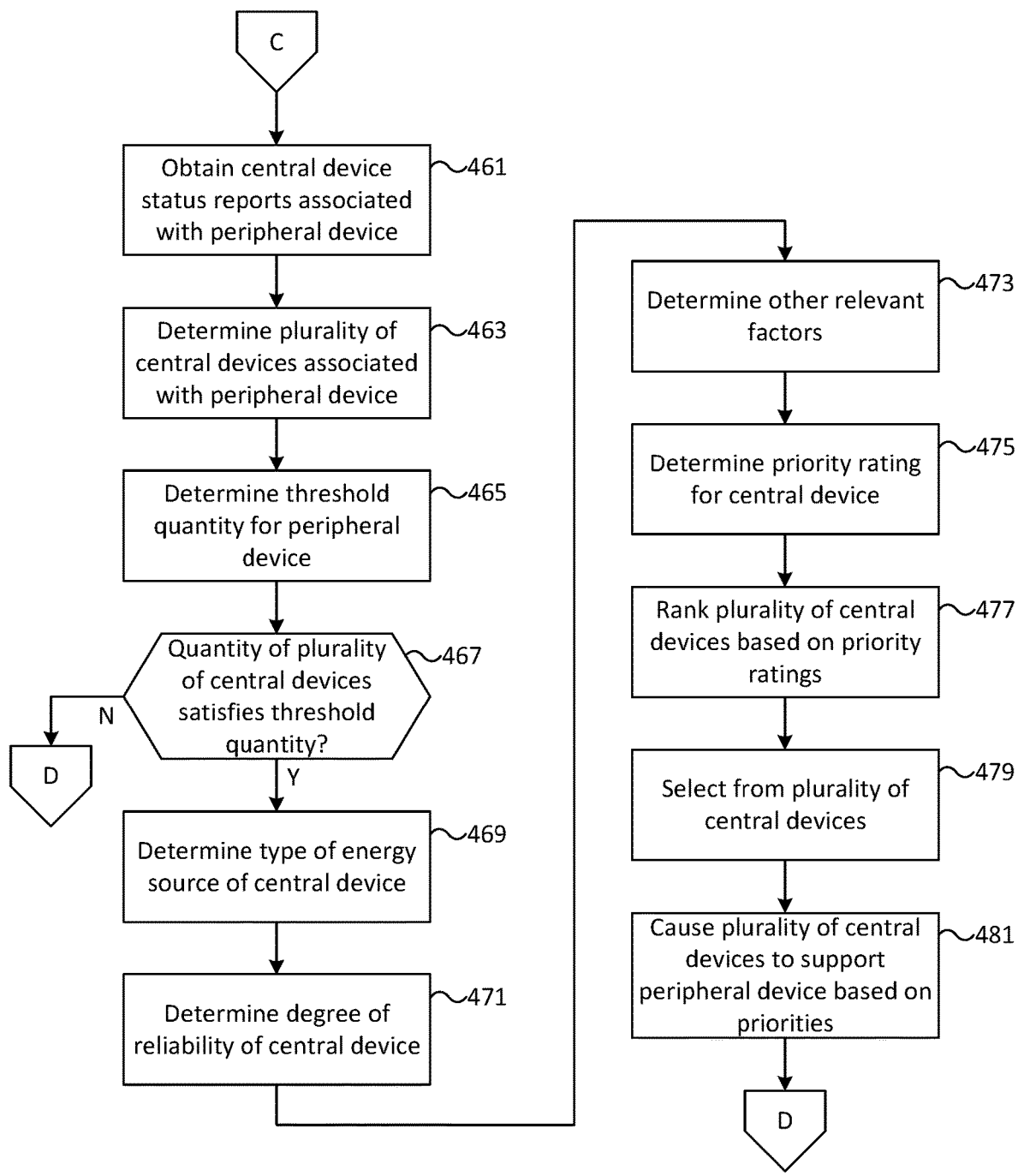

FIGS. 4A-4C show a flowchart of an example method for prioritized usage of devices. The method may be performed, for example, by one or more of the system as discussed in connection with FIG. 3 (e.g., the server 301, one or more of the central devices 305A-305D, or one or more of the peripheral devices 307A-307B). For example, the steps of the method may be performed by a computing device. The computing device may comprise a server separate from central devices (e.g., 305A-305D) and/or peripheral devices (e.g., 307A-307B). The computing device may comprise one of the central devices (e.g., 305A-305D). The computing device may comprise one of the peripheral devices (e.g., 307A-307B). The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

In step 401, a computing device (e.g., the server 301, a central device of the central devices 305A-305D, and/or a peripheral device of the peripheral devices 307A-307B) may determine whether status reports are received from central devices. The computing device may listen to its incoming traffic, and determine whether status reports from central devices are included in the incoming traffic. Central devices may send status reports to the computing device, for example, based on a peripheral device prompting the central devices to support one or more functions of the peripheral device. For example, a peripheral device (e.g., an electronic finder) during its initialization process may advertise itself to central devices within its communication range (e.g., by broadcasting an advertising message). The peripheral device may also advertise itself to central devices within the surrounding area of the peripheral device after its initialization process, so that the peripheral device may discover new central devices, or disregard central devices that become unavailable, for supporting the function(s) of the peripheral device. The central devices may, based on receiving the advertisement message from the peripheral device, send status reports to the computing device. A central device may additionally or alternatively send a status report to the computing device if a status of the central device is changed (e.g., from an active mode to an inactive mode or a sleep mode, from being available to support a peripheral device to being unavailable to support the peripheral device, from being powered by one type of energy source to being powered by another type of energy source).

A status report received from a central device may indicate, for example, a type of energy source of the central device, a signal strength level of signals between the central device and the peripheral device requesting support from the central device, a level of usage of computational resources of the central device, and/or any other type of information. The status report may be used for determining a priority of the central device, among other available central devices, for supporting the function(s) of the peripheral device, as discussed in greater detail below in connection with FIG. 4C. If the computing device determines that status reports are received from central devices (step 401: Y), the method may proceed to step 403. If the computing device determines that status reports are not received from central devices (step 401: N), the method may proceed to step 405.

In step 403, the computing device may store the status reports as received in step 401. The status reports may be stored in a data storage of the computing device. The status reports may be used for determining priorities of central devices for supporting peripheral devices. Each of the status reports may be associated with (e.g., identified by) a central device and a peripheral device. The status report may be additionally associated with an identifier of a service implemented on the peripheral device, for example, if the peripheral device implements multiple services, so that using the status report to determine a priority of the central device, among other available central devices, for supporting the peripheral device may be performed on a service level.

In step 405, the computing device may determine whether to update management data (e.g., data relating to peripheral devices managed by the computing device). A particular set of peripheral device(s) may be managed by the computing device. For example, if the computing device comprises the server 301, the computing device may be configured to be responsible for managing a particular group of peripheral devices (e.g., such as peripheral devices within a designated region of the server 301). If the computing device comprises a central device of the central devices 305A-305D, the computing device may be configured to be responsible for managing a group of peripheral devices that request the computing device to support their functions. If the computing device comprises a peripheral device of the peripheral devices 307A-307B, the computing device may be configured to be responsible for managing the peripheral device itself. The computing device may, for example, prioritize the usage of central devices for each of its managed peripheral devices. The computing device may compile and store data for its managed peripheral devices, including various parameters and/or other information that may be used in the processes associated with determining prioritized usage of central devices for the peripheral devices, as discussed in greater detail below in connection with steps 407, 409, 411, 413.

The computing device may, for example, periodically or continuously update management data (e.g., data relating to peripheral devices managed by the computing device). Additionally or alternatively, the computing device may determine to update the peripheral device data if a particular event is detected. For example, the computing device may determine to update the peripheral device data if a new peripheral device registers to be managed by the computing device (e.g., the server 301). If the computing device determines to update management data (e.g., data relating to peripheral devices managed by the computing device) (step 405: Y), the method may proceed to step 407. If the computing device determines not to update management data (e.g., data relating to peripheral devices managed by the computing device) (step 405: N), the method may proceed to step 431 (FIG. 4B).

In step 407, the computing device may determine, for a particular peripheral device managed (or to be managed) by the computing device, an identifier of the peripheral device, a type of the peripheral device, and/or a service implemented on the peripheral device. The type of the peripheral device may comprise, for example, an electronic finder, a smartphone, a WiFi client device, a camera, etc. The service implemented on the peripheral device may comprise, for example, a service to determine the current location of the peripheral device, a service to send a message to another device, a service to analyze WiFi signals data for detecting object motion, a service to process captured images for detecting objects, etc. If the peripheral device implements multiple services requesting support from central devices, the computing device may manage and determine all or some of the multiple services. Additionally or alternatively, some service(s) implemented on a peripheral device may be managed by a first computing device, and some other service(s) implemented on the peripheral device may be managed by a second computing device.

In step 409, the computing device may determine a central device energy consumption level associated with a particular peripheral device managed by the computing device. The peripheral device (e.g., an electronic finder) in carrying out its function may cause central devices to execute corresponding functions to support the function of the peripheral device. The central devices may consume energy to execute the supporting functions. A level of energy consumption, of the central devices, attributable to supporting the peripheral device may be determined. For example, each of the central devices may monitor its energy consumption level attributable to supporting the peripheral device, and may send that information to the computing device. The computing device may, for example, calculate an average level of energy consumption, across multiple time periods and/or across the central devices that supported the peripheral device. If the peripheral device implements multiple services requesting support from central devices, the computing device may determine an energy consumption level, of central devices, attributable to supporting each service.

In step 411, the computing device may determine whether to prioritize usage of central devices for a particular peripheral device. Prioritized usage of central devices to support a peripheral device may be desired, for example, if the energy consumption level (as determined in step 409) satisfies a threshold level of energy consumption. For example, the computing device may determine to prioritize usage of central devices for the peripheral device, if the peripheral device (e.g., an electronic finder) causes a central device (e.g., a smartphone powered by a battery of 1,000 mAH) to use 200 mAH per day to support the peripheral device. The determination may be indicated by and stored as a flag associated with the peripheral device (e.g., "1" indicating to prioritize usage for the peripheral device and "0" indicating not to prioritize usage for the peripheral device). The determination of whether to prioritize usage of central devices for a peripheral device may additionally or alternatively be configured by an administrator. If the peripheral device implements multiple services requesting support from central devices, the computing device may determine whether to prioritize usage of central devices for each service.

In step 413, the computing device may determine a frequency for updating a usage arrangement for a particular peripheral device. The surrounding environment of the peripheral device may change, for example, if the peripheral device moves from one place to another. The state of central devices in the surrounding area of the peripheral device may change. For example, new central devices may become available to support the peripheral device. Existing central devices may move, may become unavailable, may change from an active mode to an inactive mode or a sleep mode, may change from being powered by one type of energy source to being powered by another type of energy source, and/or may have other status changes. As the surrounding environment of the peripheral device changes, the existing arrangement of using certain prioritized central devices for the peripheral device may be updated. The computing device may determine a frequency for making the update.

The frequency may be, for example, set to any desired frequency by an administrator. Additionally or alternatively, the frequency may be determined based on a degree of change of the surrounding environment of the peripheral device. The computing device may estimate the degree of change based on, for example, previously determined available central devices for supporting the peripheral device. The degree of change may, for example, correspond to the number of central device status changes between two points in time divided by the time length between the two points in time. The computing device may determine a mapping of the degree of change to the frequency for updating usage arrangement, and may determine, based on the mapping, the frequency for updating usage arrangement for the peripheral device. If the peripheral device implements multiple services requesting support from central devices, the computing device may determine a frequency for updating usage arrangement for each of the services.

The computing device may perform steps 407, 409, 411, 413 for each of the peripheral devices managed by the computing device. The peripheral device data produced by performing steps 407, 409, 411, 413 may be stored in the computing device. Table 1 shows examples of such peripheral device data.

TABLE 1

| Device Identifier | Device Type | Implemented Service | Associated Energy Usage on Central Device | Prioritization Flag | Updating Frequency |
|---|---|---|---|---|---|
| DeviceA | Electronic finder | Tracking | 600 mAH per day | 1 | Every 1 hour |
| DeviceB | Smartphone | Tracking | 700 mAH per day | 1 | Every 20 minutes |
| DeviceB | Smartphone | Messaging | 20 mAH per day | 0 | N/A |
| DeviceC | Electronic finder | Tracking | 300 mAH per day | 1 | Every 24 hours |

As shown in Table 1, various types of data may be determined for each peripheral device (e.g., DeviceA, DeviceB, and DeviceC) managed by the computing device. For example, an identifier of a peripheral device (step 407), a type of the peripheral device (step 407), a service implemented on the peripheral device (step 407), a level of energy usage, on central devices, attributable to the peripheral device (step 409), a prioritization flag (step 411), and a frequency for updating the usage arrangement of central devices for the peripheral device (step 413) may be determined for a particular peripheral device. If multiple services are implemented on a peripheral device, the various types of data may be determined for each of the services implemented on the peripheral device. For example, a service to track the location of the peripheral device DeviceB and a service to send messages from DeviceB to other devices may be implemented on DeviceB. Levels of energy consumption, on a central device, attributable to the two services may be determined to be different. Accordingly, it may be determined that prioritizing usage of central devices for the tracking service of DeviceB may be desired, and that prioritizing usage of central devices for the messaging service of DeviceB might not be needed.

In step 431 (FIG. 4B), the computing device may determine peripheral devices managed by the computing device. The determination may be based on, for example, the peripheral device data maintained by the computing device as discussed in connection with step 405. A set of peripheral device(s) may be managed by the computing device. For example, if the computing device comprises the server 301, the computing device may be configured to be responsible for managing a particular group of peripheral devices (e.g., such as peripheral devices within a designated region of the server 301). If the computing device comprises a central device of the central devices 305A-305D, the computing device may be configured to be responsible for managing a group of peripheral devices that request the computing device to support their functions. If the computing device comprises a peripheral device of the peripheral devices 307A-307B, the computing device may be configured to be responsible for managing itself. If a peripheral device managed by the computing device implements multiple services, the computing device may identify the service(s), of the multiple services of the peripheral device, that are managed by the computing device.

In step 433, the computing device may determine a peripheral device of the peripheral devices managed by the computing device. The computing device may perform one or more steps for determining and/or updating the prioritized usage of central devices for the determined peripheral device. For example, the computing device may sequentially select, from the peripheral devices managed by the computing device, a peripheral device for subsequent processing. If two or more services are implemented on the determined peripheral device and are managed by the computing device, the computing device may perform, with respect to each of the two or more services and in a similar manner, those processes to be performed with respect to a single service implemented on the determined peripheral device as discussed below.

In step 435, the computing device may determine whether to update the usage arrangement of central devices for the peripheral device as determined in step 433. The determination may be based on a level of energy consumption, on a central device, attributable to supporting the peripheral device. For example, if the level of energy consumption satisfies a threshold level of energy consumption, the computing device may determine to update usage arrangement of central devices for the peripheral device, in a similar manner as discussed in connection with step 409, 411. Additionally or alternatively, the computing device may determine, based on the prioritization flag or indication associated with the peripheral device as discussed in connection with step 411, whether to update the usage arrangement of central devices for the peripheral device. For example, if the prioritization flag or indication associated with the peripheral device corresponds to one (1), the computing device may determine to update the usage arrangement of central devices for the peripheral device. If the prioritization flag or indication associated with the peripheral device corresponds to zero (0), the computing device may determine not to update the usage arrangement of central devices for the peripheral device.

If the computing device determines to update the usage arrangement of central devices for the peripheral device (step 435: Y), the method may proceed to step 437. If the computing device determines not to update the usage arrangement of central devices for the peripheral device (step 435: N), the method may proceed to step 441. If multiple services are implemented on the peripheral device and are managed by the computing device, the computing device may similarly determine whether to update the usage arrangement of central devices for each of the multiple services. For example, for each service of the multiple services, the computing device may determine a level of energy consumption, on a central device, attributable to supporting the service, for determining whether to update the usage arrangement for that service.

In step 437, the computing device may determine whether an event triggering the usage arrangement update for the peripheral device has been detected. The event may comprise, for example, a change of a status of a central device associated with the peripheral device (e.g., a central device that is currently supporting the peripheral device, a central device that was previously available to support the peripheral device but was not selected to support the peripheral device in view of central devices with higher priorities, or a new central device that becomes available to support the peripheral device). The computing device may detect such a triggering event based on analyzing status reports associated with the peripheral device (as received in step 401). For example, a status report associated with the peripheral device may indicate that a central device within the surrounding area of the peripheral device has been activated and/or has become available to support the peripheral device. A status report associated with the peripheral device may indicate that a central device within the surrounding area of the peripheral device (e.g., a central device that is currently supporting the peripheral device, or a central device that was previously available to support the peripheral device but was not selected to support the peripheral device in view of central devices with higher priorities) has changed from an active mode to an inactive mode or a sleep mode (e.g., in response to the central device (without a battery) being disconnected from a power line or charger, in response to the central device (without being connected to a power line or charger) having exhausted its battery, or in response to a user instructing the central device to turn into an inactive mode or a sleep mode), and/or has become unavailable to support the peripheral device. A status report associated with the peripheral device may indicate that a type of energy source of a central device within the surrounding area of the peripheral device has changed (e.g., from being powered by a charger or a power line to being powered by a battery, or from being powered by a battery to being powered by a charger or power line). The central device status changes as indicated in the status reports may trigger the usage arrangement update for the peripheral device.

If the computing device determines that an event triggering the usage arrangement update for the peripheral device has been detected (step 437: Y), the method may proceed to step 461 (FIG. 4C). If the computing device determines that an event triggering the usage arrangement update for the peripheral device has not been detected (step 437: N), the method may proceed to step 439. If multiple services are implemented on the peripheral device and are managed by the computing device, the computing device may similarly determine whether an event triggering the usage arrangement update for each of the multiple services has been detected. Such an event associated with a particular service may comprise, for example, a new central device becoming available to support the service, or a central device (e.g., a central device that is currently supporting the service, or a central device that was previously available to support the service but was not selected to support the service in view of central devices with higher priorities) changing from an active mode to an inactive mode or a sleep mode, becoming unavailable to support the service, or changing from being powered by one type of energy source to being powered by another type of energy source.

In step 439, the computing device may determine whether a period triggering the usage arrangement update for the peripheral device has been reached. The period may be determined based on a frequency for updating a usage arrangement for the peripheral device as determined in step 413. For example, the computing device may set a countdown timer corresponding to the period, and may determine that an update-triggering period has been reached when the timer reaches zero (0). If the computing device determines that a period triggering the usage arrangement update for the peripheral device has been reached (step 439: Y), the method may proceed to step 461 (FIG. 4C). If the computing device determines that an event triggering the usage arrangement update for the peripheral device has not been reached (step 439: N), the method may proceed to step 441. If multiple services are implemented on the peripheral device and are managed by the computing device, the computing device may similarly determine whether a period triggering the usage arrangement update for each of the multiple services has been reached. The computing device may use an updating frequency and/or period specific to each service of the multiple services, as discussed in connection with step 413.

In step 441, the computing device may determine whether the peripheral devices managed by the computing device as determined in step 431 have been processed with respect to updating their usage arrangements. For example, the computing device may determine whether usage arrangements have been updated for all of the managed peripheral devices. Alternatively, the computing device may be configured to process only a portion of the managed peripheral devices, and may determine whether the usage arrangement has been updated for each peripheral device of the portion of the managed peripheral devices. If multiple services are implemented on a peripheral device for processing and are managed by the computing device, the computing device may additionally determine whether each service of the multiple services has been processed.

If the computing device determines that the managed peripheral devices have been processed with respect to updating usage arrangements (step 441: Y), the method may repeat step 401 (FIG. 4A). If the computing device determines that the managed peripheral devices have not been processed with respect to updating usage arrangements (step 441: N), the method may repeat step 433. For example, in step 433, the computing device may determine, from the managed peripheral devices, a next peripheral device for updating its usage arrangement of central devices.

In step 461 (FIG. 4C), the computing device may obtain central device status reports associated with the peripheral device. If the usage arrangement update for the peripheral device was triggered by reaching the period as discussed in connection with step 439, the computing device may cause the peripheral device to advertise itself to central devices (e.g., by broadcasting an advertising message), and each of the central devices may send a status report to the computing device. Additionally or alternatively, the computing device might not obtain the central device status reports, and may instead request the relevant information from the peripheral device (and/or may obtain the relevant information based on analyzing network traffic, e.g., sent from the peripheral device). For example, the peripheral device may store relevant information about its supporting central devices, and may (e.g., upon request) send the relevant information to the computing device. The relevant information may be used and/or analyzed by the computing device, for example, for determining the usage arrangement of central devices for the peripheral device, in a similar manner as the central device status reports may be used. If the usage arrangement update for the peripheral device was triggered by detecting an event that a central device within the surrounding area of the peripheral device has been activated and/or has become available to support the peripheral device, and/or was triggered by other types of events (e.g., as discussed in connection with steps 435, 437, 439), the computing device may obtain the status report indicating the event, as well as status reports from other central devices within the surrounding area of the peripheral device (e.g., status reports previously received from the other central devices and stored by the computing device, or updated status reports from the other central devices as requested in response to detecting the triggering event).

If the usage arrangement update for the peripheral device was triggered by detecting an event that a central device within the surrounding area of the peripheral device (e.g., a central device that is currently supporting the peripheral device, or a central device that was previously available to support the peripheral device but was not selected to support the peripheral device in view of central devices with higher priorities) has changed a status (e.g., from an active mode to an inactive mode or a sleep mode, from being available to support the peripheral device to being unavailable to support the peripheral device, or from being powered by a first type of energy source to being powered by a second type of energy source different from the first type of energy source), the computing device may obtain the status report indicating the event, as well as status reports from other central devices within the surrounding area of the peripheral device (e.g., status reports previously received from the other central devices and stored by the computing device, or updated status reports from the other central devices as requested in response to detecting the triggering event).

For example, if a central device that is currently supporting the peripheral device changes from being powered by a charger to being powered by a battery, or if a central device that was not selected for supporting the peripheral device changes from being powered by a battery to being powered by a charger, the computing device may in response obtain status reports from the central device as well as other central devices within the surrounding area of the peripheral device, for updating the usage arrangement for the peripheral device. Additionally or alternatively, if the peripheral device loses connection and/or support from a supporting central device (e.g., due to the supporting central device becoming unavailable, changing to an inactive mode or a sleep mode, becoming unable to communicate with the peripheral device, etc.), the peripheral device may reset its arrangement of supporting central devices (e.g., by advertising itself and/or broadcasting an advertisement message), and central devices receiving the peripheral device's advertising indication may send status reports to the computing device. The computing device may receive and obtain the status reports, and may detect a triggering event (e.g., a supporting central device becoming unavailable).

In step 463, the computing device may determine a plurality of central devices associated with the peripheral device. The determination may be based on the status reports obtained in step 461. For example, each of the status reports associated with the peripheral device may indicate a central device that is available to support the peripheral device. The computing device may determine the plurality of central devices associated with the peripheral device based on aggregating the central device indications in the status reports. The computing device may determine the plurality of central devices associated with the peripheral device to include central devices that are in an active mode and/or are available to support the peripheral device, and to exclude peripheral devices that are in an inactive mode or a sleep mode and/or are unavailable to support the peripheral device. Additionally or alternatively, the plurality of central devices associated with the peripheral device may comprise central devices whose signal strength with the peripheral device satisfies a signal strength threshold (e.g., indicating communications between the central devices and the peripheral device will be reliable). A status report from a central device may indicate a level of signal strength of signals between the central device and the peripheral device, and may be used to determine if the central device may be added as a member to the plurality of central devices associated with the peripheral device.

In step 465, the computing device may determine a threshold quantity of central devices to be used to support the peripheral device. The threshold quantity may be determined, for example, based on the service implemented on the peripheral device. The threshold quantity may be one (1), for example, if one (1) central device is to be used (e.g., sufficient and/or necessary) to support the service implemented on the peripheral device. For example, the service implemented on the peripheral device may comprise a service to determine a rough location of the peripheral device based on determining that it is within a communication range of a central device, and the threshold quantity for the peripheral device may be one (1).

In step 467, the computing device may determine whether a quantity of the plurality of central devices as determined in step 463 satisfies (e.g., exceeds) the threshold quantity as determined in step 465 (e.g., indicating whether the quantity of the plurality of central devices is more than what is to be used to support the peripheral device). Additionally or alternatively, if the computing device comprises a first central device of the plurality of central devices as determined in step 463, the computing device may determine whether a quantity of the plurality of central devices other than the first central device satisfies (e.g., exceeds) the threshold quantity (as determined in step 465) subtracted by one (1). If the quantity of the plurality of central devices satisfies the threshold quantity (step 467: Y), the method may proceed to step 469, and the computing device may determine the prioritized usage of the plurality of central devices for the peripheral device. If the quantity of the plurality of central devices does not satisfy the threshold quantity (step 467: N), the method may repeat step 441 (FIG. 4B).

In step 469, the computing device may determine a type of energy source of a particular central device of the plurality of central devices as determined in step 463. The type of energy source may be indicated in the status report received from the central device. The type of energy source may comprise, for example, a power line, a battery without being connected to a charger, a battery connected to a charger, etc. The type of energy source may be used to determine a priority of the central device for supporting the peripheral device. The computing device may determine a type of energy source for each of the plurality of central devices as determined in step 463.

In step 471, the computing device may determine a degree of reliability of a particular central device of the plurality of central devices as determined in step 463. The degree of reliability may be based on, for example, a level of signal strength of signals between the central device and the peripheral device. The level of signal strength may be indicated in the status report received from the central device. The degree of reliability may additionally or alternatively be based on a distance between the central device and the peripheral device. The degree of reliability may be used to determine a priority of the central device for supporting the peripheral device. The computing device may determine a degree of reliability for each of the plurality of central devices as determined in step 463.

In step 473, the computing device may determine other factors, associated with a particular central device of the plurality of central devices as determined in step 463, as relevant for determining a priority of the central device for supporting the peripheral device. For example, it may be desirable not to have the central device to support the peripheral device, if the central device already supports a large number (e.g., 100) of peripheral devices, the computational resources (e.g., the Central Processing Unit, the memory, the network interface) of the central device are running at nearly full capacity, and/or adding another peripheral device to the load of the central device may cause degradation of performance (e.g., with respect to the already-supported peripheral devices and/or the to-be-added peripheral device). The computing device may determine, for example, a usage rate of computational resources of the central device. The usage rate may be, for example, monitored by the central device and reported to the computing device. The computing device may determine the other relevant factors for each of the plurality of central devices as determined in step 463.

In step 475, the computing device may determine a priority rating for a particular central device of the plurality of central devices as determined in step 463. The priority rating for the central device may indicate a preference, relative to priority ratings for other central devices, for selection of the central device to support the peripheral device. As discussed herein, the priority rating for the central device with a higher value may indicate a stronger preference for the central device to be selected to support the peripheral device, but a person having ordinary skill in the art may similarly use the priority rating for the central device with a lower value to indicate a stronger preference for selection of the central device to support the peripheral device.

The priority rating may be determined based on one or more of the factors as discussed in steps 469, 471, 473. For example, the priority rating for the central device may be determined based on the type of energy source of the central device. A priority rating of ten (10) may be assigned, if the type of energy source comprises a power line. A priority rating of five (5) may be assigned, if the type of energy source comprises a battery connected to a charger. A priority rating of one (1) may be assigned, if the type of energy source comprises a battery without being connected to a charger. The computing device may determine the priority rating for the central device based on the type of energy source of the central device. The priority rating for the central device based on the type of energy source of the central device may alternatively be determined by the central device itself, and may be sent to the computing device.

Additionally or alternatively, the priority rating for the central device may be based on the degree of reliability of the central device. For example, if the central device has a low degree of reliability, as indicated by a low level of signal strength of signals between the central device and the peripheral device, the priority rating for the central device may be adjusted (e.g., reduced), so that a less reliable central device for supporting the peripheral device may have a smaller chance to be selected for supporting the peripheral device. Additionally or alternatively, the priority rating for the central device may be based on the usage rate of computational resources of the central device. For example, if the central device has a high usage rate of computational resources (e.g., 95% of its computational resources are being used), the priority rating for the central device may be adjusted (e.g., reduced), so that a central device with a higher load may have a smaller chance to be selected for supporting the peripheral device.

The priority rating for the central device may be determined based on multiple factors. For example, the priority rating for the central device may be based on a type of energy source of the central device and a level of signal strength of signals between the central device and the peripheral device. The priority rating for the central device may correspond to, for example, a sum of a first value based on the type of energy source of the central device and a second value based on the level of signal strength of signals between the central device and the peripheral device. The first value may be determined in a similar manner as discussed above for determining a priority rating based on a type of energy source. For example, the first value may be determined to be ten (10), if the type of energy source comprises a power line. The first value may be determined to be five (5), if the type of energy source comprises a battery connected to a charger. The first value may be determined to be one (1), if the type of energy source comprises a battery without being connected to a charger. The second value may be determined based on the level of signal strength in various manners. For example, the second value may be determined to be one (1), if the level of signal strength of signals between the central device and the peripheral device is below a first threshold. The second value may be determined to be seven (7), if the level of signal strength of signals between the central device and the peripheral device is above a second threshold (e.g., that is higher than the first threshold). The second value may be determined to be three (3), if the level of signal strength of signals between the central device and the peripheral device is within a range between the first threshold and the second threshold (e.g., the first threshold and the second threshold inclusive).

For example, the priority rating for the central device may correspond to eleven (11), which corresponds to the sum of a first value of ten (10) and a second value of one (1), if the type of energy source of the central device comprises a power line, and the level of signal strength of signals between the central device and the peripheral device is below the first threshold. The priority rating for the central device may correspond to twelve (12), which corresponds to the sum of a first value of five (5) and a second value of seven (7), if the type of energy source of the central device comprises a battery connected to a charger, and the level of signal strength of signals between the central device and the peripheral device is above the second threshold. The computing device may determine a priority rating for each of the plurality of central devices as determined in step 463. Alternatively, each central device (e.g., of the plurality of central devices as determined in step 463) may determine a priority rating for itself, and may send its priority rating to the computing device.

The determination of the priority ratings may be based on one or more of the factors as discussed in steps 469, 471, 473. The one or more of the factors may be determined based on, for example, the particular type of function or service of the peripheral device and/or the type of function or service to be performed by the central device(s) in connection with the peripheral device. Different weights may be assigned to the different one or more factors according to the function or service of the peripheral device and/or the associated central device(s). For example, if the service of the peripheral device comprises a service to determine a location of the peripheral device, which service may contribute to substantial usage of energy on associated central device(s), a greater weight may be assigned to the factor of energy source type for determining priority ratings. Additionally or alternatively, if the service of the peripheral device comprises a service to capture wireless WiFi signals and the service of the associated central device(s) comprises a service to analyze the captured WiFi signals to detect object motion, which service may request a higher standard of support of computational resources, a greater weight may be assigned to the factor of computational resources for determining priority ratings. Additionally or alternatively, if the service of the peripheral device comprises a service to capture images (e.g., of the environment in which the peripheral device is located) and the service of the associated central device(s) comprises a service to process the captured images to detect objects (e.g., indicated in the images), which service may request a higher standard of support of computational resources, a greater weight may be assigned to the factor of computational resources for determining priority ratings. Additionally or alternatively, an administrator and/or operator may assign different weights to the different factors for determining the priority ratings.

In step 477, the computing device may rank the plurality of central devices as determined in step 473 based on their corresponding priority ratings as determined in step 475. A central device with a higher priority rating may be ranked higher, and a central device with a lower priority rating may be ranked lower. In step 479, the computing device may select, from the plurality of ranked central devices, one or more central devices for supporting the peripheral device. The selected one or more central devices may comprise, for example, one or more highest ranking central devices. The quantity of central devices selected may correspond to the threshold quantity for the peripheral device as determined in step 465.

In step 481, the computing device may cause the plurality of central devices as determined in step 463 to support, based on their corresponding priorities, the peripheral device. For example, the computing device may cause (e.g., send instructions to) the selected central devices to support the peripheral device, and may cause (e.g., send instructions to) the non-selected central devices not to support the peripheral device. For example, the selected central devices may be instructed to execute services, functions, and/or applications corresponding to the service implemented on the peripheral device. Additionally or alternatively, the selected central device(s) may perform one or more functions on behalf of the peripheral device. For example, if the apparatuses, systems, and/or methods as described herein are used in connection with WiFi motion detection, the selected central device(s) may perform, on behalf of the peripheral device, the processing of data of WiFi signals captured by the peripheral device for detecting object motion. If the apparatuses, systems, and/or methods as described herein are used in connection with camera object detection, the selected central device(s) may perform, on behalf of the peripheral device, the processing of images captured by the peripheral device for detecting objects (e.g., indicated in the images). The non-selected central devices may be instructed to not execute services, functions, and/or applications corresponding to the service implemented on the peripheral device. Additionally or alternatively, the computing device may cause a central device with a higher priority rating to communicate more frequently with the peripheral device, and may cause a central device with a lower priority rating to communicate less frequently with the peripheral device.

If multiple services are implemented on the peripheral device and are managed by the computing device, the computing device may perform the steps of FIG. 4C with respect to each service of the multiple services, in a similar manner as the steps may be performed with respect to a single service implemented on the peripheral device. The steps performed with respect to a particular service of the multiple services may use data and/or parameters that are specific to that particular service. For example, for each service of the multiple services implemented on the peripheral device, the computing device may obtain central device status reports associated with the service, may determine a plurality of central devices associated with (e.g., available to support) the service, may determine a threshold quantity of central devices to be used to support the service, may determine priority ratings for the plurality of central devices associated with the service, may rank the plurality of central devices associated with the service based on the priority ratings, may select, based on the ranking, one or more central devices, and may cause the plurality of central devices associated with the service to support, based on their priority ratings, the service implemented on the peripheral device.

Additionally or alternatively, a computing device may determine and/or update the usage arrangement of central devices for a particular peripheral device without using priority ratings assigned to the central devices. For example, the computing device may determine that, for a particular peripheral device, a threshold number (e.g., 5) of central devices are to be used to support the peripheral device. The computing device may determine a plurality (e.g., 10) of central devices that are available to support the peripheral device. If the quantity of the plurality of central devices is determined to be above the threshold number, the computing device may select, from the plurality of central devices, certain central devices for supporting the peripheral device. For example, the computing device may be configured to determine, from the plurality of central devices, a group of central devices that are powered by power lines. The computing device may determine whether the quantity of the power-line powered central devices satisfies the threshold number. If the quantity of the power-line powered central devices is equal to the threshold number, then the power-line powered central devices may be selected for supporting the peripheral device. If the quantity of the power-line powered central devices is above the threshold number, then the threshold number of central devices may be selected from the group of power-line powered central devices for supporting the peripheral device. The selection may be based on, for example, proximity, signal strength, and/or other factors (e.g., the central devices closest to the peripheral device and/or having greatest signal strength with the peripheral device may be selected). If the quantity of the power-line powered central devices is below the threshold number, then the group of power-line powered central devices may be selected for supporting the peripheral device.

If the quantity of the power-line powered central devices is below the threshold number, then central devices in addition to the selected group of power-line powered central devices may be selected, from the plurality of central devices that are available to support the peripheral device, for supporting the peripheral device. For example, the computing device may next determine, from the plurality of central devices that are available to support the peripheral device, a group of central devices that are powered by batteries connected to chargers. The computing device may determine whether the quantity of the central devices powered by batteries connected to chargers satisfies the threshold number minus the quantity of central devices already selected for supporting the peripheral device. If the quantity of the central devices powered by batteries connected to chargers is equal to the threshold number minus the quantity of central devices already selected for supporting the peripheral device, the group of central devices powered by batteries connected to chargers may be selected for supporting the peripheral device. If the quantity of the central devices powered by batteries connected to chargers is above the threshold number minus the quantity of central devices already selected for supporting the peripheral device, then a particular number (e.g., corresponding to the threshold number minus the quantity of central devices already selected for supporting the peripheral device) of central devices may be selected from the group of central devices powered by batteries connected to chargers for supporting the peripheral device. The selection may be based on, for example, proximity, signal strength, and/or other factors, as described herein. If the quantity of the central devices powered by batteries connected to chargers is below the threshold number minus the quantity of central devices already selected for supporting the peripheral device, then the group of central devices powered by batteries connected to chargers may be selected for supporting the peripheral device, and additionally other central devices (e.g., central devices powered by batteries without being connected to chargers) may be selected, from the plurality of central devices that are available to support the peripheral device, for supporting the peripheral device. The selection of the other central devices (e.g., from a group of central devices of another type, such as powered by batteries without being connected to chargers) may be performed in a similar manner as the selection of central devices from the group of power-line powered central devices and/or from the group of central devices powered by batteries connected to chargers, as discussed above. Central devices, of the plurality of central devices that are available to support the peripheral device, not selected for supporting the peripheral device may be configured, for example, to not support the peripheral device and/or to not communicate with the peripheral device.

Additionally or alternatively, a computing device may determine and/or update the usage arrangement of central devices for a particular peripheral device without using priority ratings assigned to the central devices and/or without using a threshold. For example, a central device is to be used to support the peripheral device. The computing device may determine a plurality of central devices that are available to support the peripheral device. The computing device may determine a type of energy source for each of the plurality of central devices, and may select, from the plurality of central devices, a central device powered by power lines for supporting the peripheral device. If there are two or more central devices powered by power lines in the plurality of central devices, the computing device may select, from the two or more central devices powered by power lines, a central device based on proximity, signal strength, and/or other factors (e.g., may select, from the two or more central devices powered by power lines, a central device that is closest to the peripheral device, and/or has greatest signal strength with the peripheral device).

Figure 5:
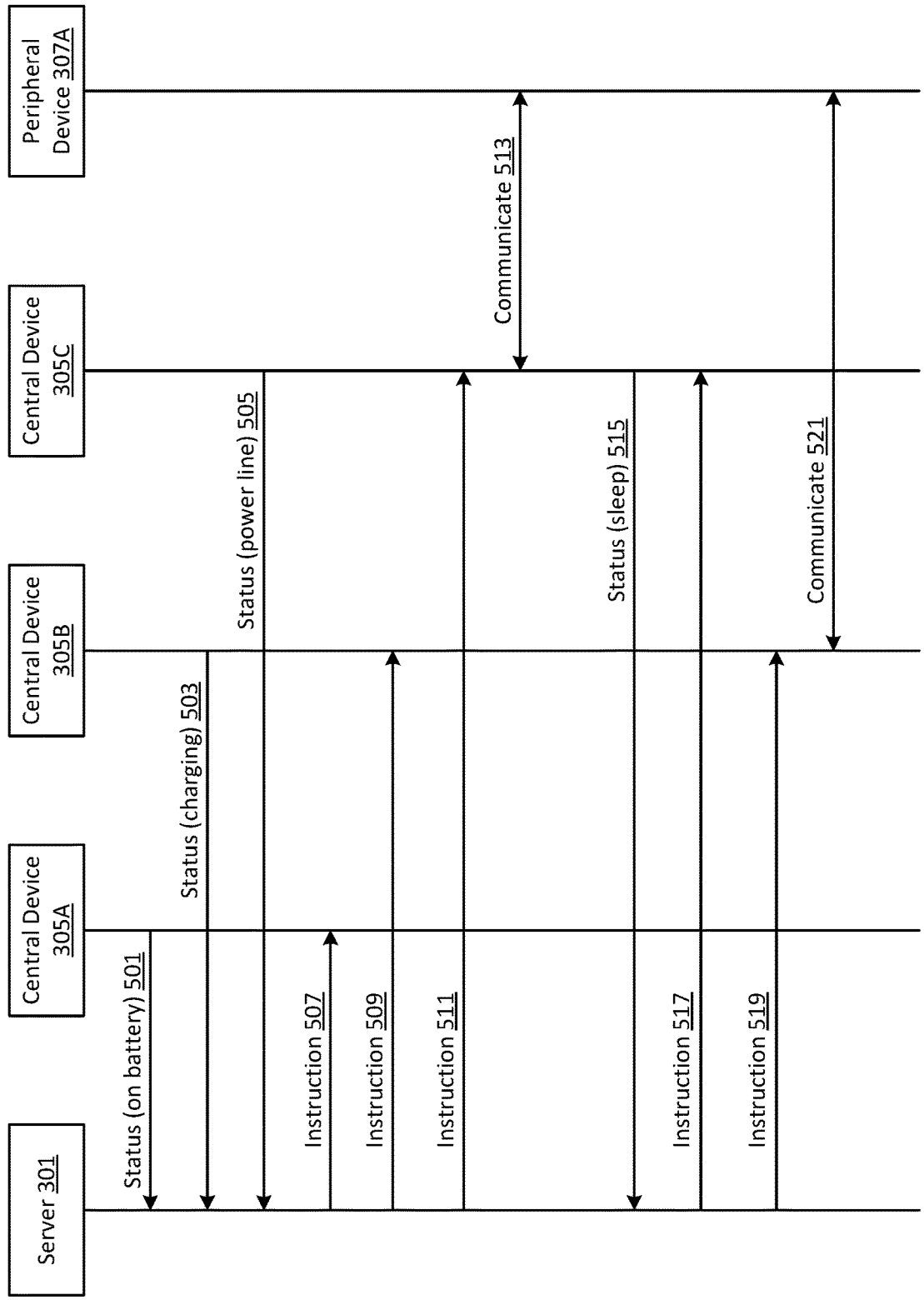
FIG. 5 is an event sequence showing an example method for prioritized usage of devices in which a server determines priorities.

FIG. 5 is an event sequence showing an example method for prioritized usage of devices in which a server determines priorities. While the steps of the event sequence are described in a particular order, the order of the steps may be altered without departing from the scope of the disclosure provided herein. Although the event sequence is described as being performed by a particular arrangement of computing systems, devices, and/or networks (e.g., the server 301, the central devices 305A-305C, and/or the peripheral device 307A), the processes may be performed by a greater or smaller number of computing systems, devices, and/or networks, and/or by any type of computing system, device, and/or network.

In step 501, the server 301 may receive, from the central device 305A (e.g., a mobile phone powered by a battery without being connected to a charger), an indication of a status of the central device 305A. The indication of the status of the central device 305A may be, for example, that the central device 305A is powered by a battery without being connected to a charger. In step 503, the server 301 may receive, from the central device 305B (e.g., a mobile phone powered by a battery and connected to a charger), an indication of a status of the central device 305B. The indication of the status of the central device 305B may be, for example, that the central device 305B is powered by a battery and is connected to a charger. In step 505, the server 301 may receive, from the central device 305C (e.g., a residential gateway powered by a power line), an indication of a status of the central device 305C. The indication of the status of the central device 305C may be, for example, that the central device 305C is powered by a power line. The central devices 305A-305C may send the status indications, for example, based on receiving an advertising message from the peripheral device 307A (e.g., an electronic finder). Steps 501, 503, 505 may be similar to and/or may comprise (and/or be comprised by) steps 401, 403 (FIG. 4A), step 439 (FIG. 4B), and/or step 461 (FIG. 4C).

The server 301 may, based on receiving the status indications, determine priorities of the central devices 305A-305C for supporting the peripheral device 307A. The determination of the priorities may be made, for example, in a similar manner as discussed in connection with FIG. 4C. For example, based on determining that the central device 305A is powered by a battery without being connected to a charger, the server 301 may assign a priority rating of one (1) to the central device 305A. Based on determining that the central device 305B is powered by a battery and is connected to a charger, the server 301 may assign a priority rating of five (5) to the central device 305B. Based on determining that the central device 305C is powered by a power line, the server 301 may assign a priority rating of ten (10) to the central device 305C. Additionally or alternatively, the priority rating of a central device of the central devices 305A-305C may be determined by the central device itself, and may be sent to the server 301.

Based on the service implemented by the peripheral device 307A, the server 301 may determine a quantity threshold corresponding to the number of central devices to be used for supporting the peripheral device 307A. For example, the peripheral device 307A may implement a service to determine a location of the peripheral device 307A based on determining that the peripheral device 307A is located within a communication range of a central device. The server 301 may determine that one central device is to be used to support the service implemented on the peripheral device 307A. The server 301 may select the central device 305C with the highest priority rating, among the central devices 305A-305C. And the central device 305C may be used to support the service implemented on the peripheral device 307A.

Based on the determined priority ratings and the selection of the central device 305C, the server 301 may send instructions to the central devices 305A-305C. In step 507, the server 301 may send, to the central device 305A, an instruction to not support the service implemented on the peripheral device 307A. In step 509, the server 301 may send, to the central device 305B, an instruction to not support the service implemented on the peripheral device 307A. In step 511, the server 301 may send, to the central device 305C, an instruction to support the service implemented on the peripheral device 307A. Based on receiving the instruction from the server 301, the central device 305C may start to communicate with the peripheral device 307A in step 513. For example, the central device 305C may execute services or functions corresponding to the service implemented on the peripheral device 307A. Steps 507, 509, 511, 513 may be similar to and/or may comprise (and/or be comprised by) step 481 (FIG. 4C).

In step 515, the central device 305C may send, to the server 301, an indication of a change of the central device 305C from an active mode to a sleep mode (e.g., in response to the central device 305C being unplugged from a power outlet, or in response to a user instructing the central device 305C to turn into a sleep mode). The indication may suggest that the central device 305C might not be available to support the service of the peripheral device 307A. The server 301 may receive the indication from the central device 305C, and may determine another central device for supporting the service of the peripheral device 307A. For example, the server 301 may determine (e.g., based on the status indications previously received from the central devices 305A-305B in steps 501, 503) that the central device 305A has a priority rating of one (1), and that the central device 305B has a priority rating of five (5). Based on determining that the central device 305B has a higher priority rating, the server 301 may determine to use the central device 305B to support the service of the peripheral device 307A. Step 515 may be similar to and/or may comprise (and/or be comprised by) steps 401, 403 (FIG. 4A), step 437 (FIG. 4B), and/or step 461 (FIG. 4C).

Based on determining to use the central device 305B to support the service of the peripheral device 307A, the server 301 may send updated instructions to the central devices (e.g., 305B-305C). In step 517, the server 301 may send, to the central device 305C, an instruction to suspend supporting the service of the peripheral device 307A. The central device 305C may change to a sleep mode before or after receiving the instruction. In step 519, the server 301 may send, to the central device 305B, an instruction to activate supporting the service of the peripheral device 307A. Based on receiving the instruction from the server 301, the central device 305B may start to communicate with the peripheral device 307A in step 521. For example, the central device 305B may execute services or functions corresponding to the service implemented on the peripheral device 307A. Steps 517, 519, 521 may be similar to and/or may comprise (and/or be comprised by) step 481 (FIG. 4C).

Additionally or alternatively, the peripheral device 307A may implement a service for which two or more central devices are to be used to provide support. For such a service, the server 301 may select, based on the priority ratings of the central devices 305A-305C and for supporting the service, two or more central devices of the central devices 305A-305C. For example, if the service of the peripheral device 307A is to be supported by two central devices, the server 301 may select (e.g., after receiving the status indications in steps 501, 503, 505) the central devices 305B-305C for supporting the service, based on determining that the priorities of the central devices 305B-305C are higher than the priority of the central device 305A. The server 301 may accordingly cause the central devices 305B-305C to communicate with the peripheral device 307A to support the service, and may cause the central device 305A to not support the service of the peripheral device 307A. In response to receiving (e.g., in step 515) an indication of a status change of the central device 305C from an active mode to a sleep mode, the server 301 may determine that the central device 305C is not available to support the service of the peripheral device 307A. The server 301 may update the usage arrangement for the service of the peripheral device 307A, and may select, from the remaining central devices and based on their respective priorities, two central devices for supporting the service of the peripheral device 307A. For example, the server 301 may select the remaining central devices 305A-305B for supporting the service. The server 301 may accordingly cause the central devices 305A-305B to communicate with the peripheral device 307A to support the service, and may cause the central device 305C to not support the service. Additionally or alternatively, the status change of the central device 305C may cause the server 301 and/or the peripheral device 307A to discover whether additional central devices in the surrounding area of the peripheral device 307A have become available to support the service of the peripheral device 307A. The peripheral device 307A may, for example, send (e.g., broadcast) an advertising message for discovering the additional central devices. If the additional central devices are discovered, the server 301 may determine the priorities of the additional central devices for supporting the service of the peripheral device 307A, and may select, from the group of the central devices 305A-305B and the additional central devices and based on their respective priorities, a quantity (e.g., two) of central devices to be used to support the service of the peripheral device 307A.

Figure 6:
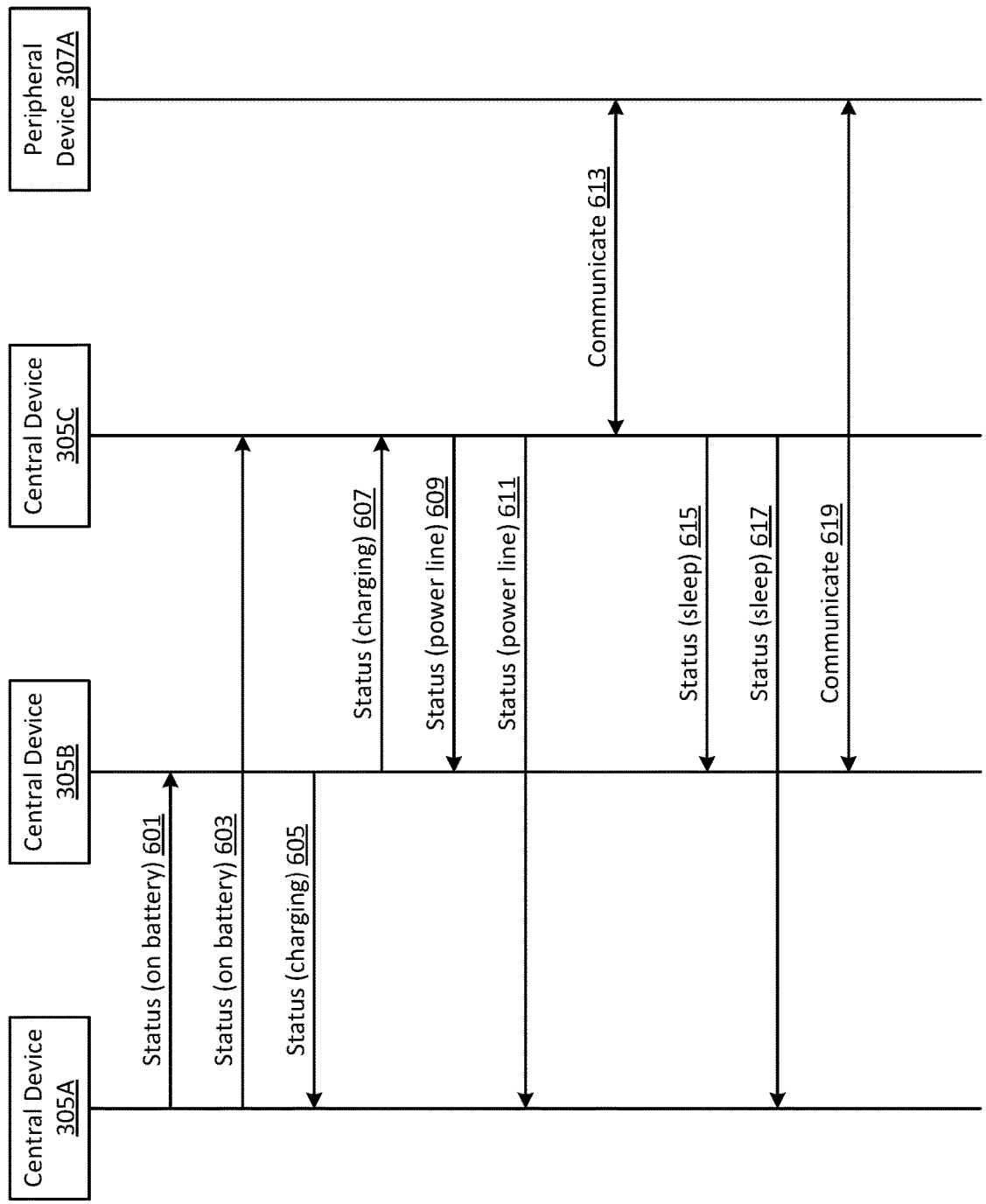
FIG. 6 is an event sequence showing an example method for prioritized usage of devices in which a central device determines priorities.

FIG. 6 is an event sequence showing an example method for prioritized usage of devices in which a central device determines priorities. While the steps of the event sequence are described in a particular order, the order of the steps may be altered without departing from the scope of the disclosure provided herein. Although the event sequence is described as being performed by a particular arrangement of computing systems, devices, and/or networks (e.g., the central devices 305A-305C and/or the peripheral device 307A), the processes may be performed by a greater or smaller number of computing systems, devices, and/or networks, and/or by any type of computing system, device, and/or network.

In step 601, the central device 305A (e.g., a mobile phone powered by a battery without being connected to a charger) may send, to the central device 305B (e.g., a mobile phone powered by a battery and connected to a charger), an indication of a status of the central device 305A. In step 603, the central device 305A may send, to the central device 305C (e.g., a residential gateway powered by a power line), an indication of a status of the central device 305A. The indication of the status of the central device 305A may be, for example, that the central device 305A is powered by a battery without being connected to a charger. The central devices 305A-305C may be able to directly communicate with each other. For example, each central device of the central devices 305A-305C may be within a communication range of each other central device of the central devices 305A-305C. In step 605, the central device 305B may send, to the central device 305A, an indication of a status of the central device 305B. In step 607, the central device 305B may send, to the central device 305C, an indication of a status of the central device 305B. The indication of the status of the central device 305B may be, for example, that the central device 305B is powered by a battery and is connected to a charger. In step 609, the central device 305C may send, to the central device 305B, an indication of a status of the central device 305C. In step 611, the central device 305C may send, to the central device 305A, an indication of a status of the central device 305C. The indication of the status of the central device 305C may be, for example, that the central device 305C is powered by a power line. The central devices 305A-305C may send (e.g., broadcast) the status indications, for example, in response to receiving an advertising message from the peripheral device 307A (e.g., an electronic finder). Steps 601, 603, 605, 607, 609, 611 may be similar to and/or may comprise (and/or be comprised by) steps 401, 403 (FIG. 4A), step 439 (FIG. 4B), and/or step 461 (FIG. 4C).

Each central device of the central devices 305A-305C may, based on receiving the status indications from other central devices and based on the status indication of the central device itself, determine priorities of the central devices 305A-305C for supporting the peripheral device 307A. Each of the central devices 305A-305C may make an independent determination of the priorities. The determination of the priorities may be made, for example, in a similar manner as discussed in connection with FIG. 4C. For example, based on the central device 305A being powered by a battery without being connected to a charger, a priority rating of one (1) may be assigned to the central device 305A. Based on the central device 305B being powered by a battery and is connected to a charger, a priority rating of five (5) may be assigned to the central device 305B. Based on the central device 305C being powered by a power line, a priority rating of ten (10) may be assigned to the central device 305C. Additionally or alternatively, the priority rating of a central device of the central devices 305A-305C may be determined by the central device itself, and may be sent to other central devices.

Based on the service implemented by the peripheral device 307A, a quantity threshold corresponding to the number of central devices to be used for supporting the peripheral device 307A may be determined. For example, the peripheral device 307A may implement a service to determine a location of the peripheral device 307A based on determining that the peripheral device 307A is located within a communication range of a central device. It may be determined that one central device is to be used to support the service implemented on the peripheral device 307A. The central device 305C with the highest priority rating may be selected among the central devices 305A-305C. And the central device 305C may be used to support the service implemented on the peripheral device 307A.

Each of the central devices 305A-305C may instruct itself based on its own independent determination of the priorities of the central devices 305A-305C and the selection of the central device 305C. For example, the central device 305A may instruct itself to not support the service implemented on the peripheral device 307A. The central device 305B may instruct itself to not support the service implemented on the peripheral device 307A. The central device 305C may instruct itself to support the service implemented on the peripheral device 307A. The central device 305C may start to communicate with the peripheral device 307A in step 613. For example, the central device 305C may execute services or functions corresponding to the service implemented on the peripheral device 307A. Step 613 may be similar to and/or may comprise (and/or be comprised by) step 481 (FIG. 4C).

In step 615, the central device 305C may send, to the central device 305B, an indication of a change of the central device 305C from an active mode to a sleep mode. In step 617, the central device 305C may send, to the central device 305A, an indication of a change of the central device 305C from an active mode to a sleep mode. The central device 305C may send (e.g., broadcast) the indication, for example, in response to the central device 305C being unplugged from a power outlet, or in response to a user instructing the central device 305C to turn into a sleep mode. The indication may suggest that the central device 305C might not be available to support the service of the peripheral device 307A. Steps 615, 617 may be similar to and/or may comprise (and/or be comprised by) steps 401, 403 (FIG. 4A), step 437 (FIG. 4B), and/or step 461 (FIG. 4C).

The central device 305C may determine to suspend supporting the service of the peripheral device 307A, as the central device 305C changes from an active mode to a sleep mode. Each of the central devices 305A-305B may, based on the status indication (sleep) received from the central device 305C, determine a central device for supporting the service of the peripheral device 307A. For example, it may be determined (e.g., based on the previous status indications of the central devices 305A-305B) that the central device 305A has a priority rating of one (1), and that the central device 305B has a priority rating of five (5). Based on the central device 305B having a higher priority rating, each of the central devices 305A-305B may determine that the central device 305B may be used to support the service of the peripheral device 307A.

The central device 305C may instruct itself to suspend supporting the service of the peripheral device 307A. The central device 305A may, based on its determination of the priorities of the central devices 305A-305B, instruct itself to not support the service of the peripheral device 307A. The central device 305B may, based on its determination of the priorities of the central devices 305A-305B, instruct itself to activate supporting the service of the peripheral device 307A. In step 619, the central device 305B may start to communicate with the peripheral device 307A. For example, the central device 305B may execute services or functions corresponding to the service implemented on the peripheral device 307A. Step 619 may be similar to and/or may comprise (and/or be comprised by) step 481 (FIG. 4C).

Additionally or alternatively, the peripheral device 307A may implement a service for which two or more central devices are to be used to provide support. For such a service, each central device of the central devices 305A-305C may select, based on the priority ratings of the central devices 305A-305C and for supporting the service, two or more central devices of the central devices 305A-305C. For example, if the service of the peripheral device 307A is to be supported by two central devices, each central device of the central devices 305A-305C may select (e.g., after communicating the status indications in steps 601, 603, 605, 607, 609, 611) the central devices 305B-305C for supporting the service, based on determining that the priorities of the central devices 305B-305C are higher than the priority of the central device 305A. The central device 305A may accordingly cause itself to not support the service of the peripheral device 307A. The central device 305B may accordingly cause itself to communicate with the peripheral device 307A to support the service. The central device 305C may accordingly cause itself to communicate with the peripheral device 307A to support the service. In response to communicating (e.g., in steps 615, 617) an indication of a status change of the central device 305C from an active mode to a sleep mode, each central device of the central devices 305A-305C may determine that the central device 305C is not available to support the service of the peripheral device 307A. The central device 305C may suspend supporting the service of the peripheral device 307A, as the central device 305C changes from an active mode to a sleep mode. Each central device of the central devices 305A-305B may update the usage arrangement for the service of the peripheral device 307A, and may select, from the remaining central devices and based on their respective priorities, two central devices for supporting the service of the peripheral device 307A. For example, each central device of the central devices 305A-

305B may select the remaining central devices 305A-305B for supporting the service. The central device 305A may accordingly cause itself to communicate with the peripheral device 307A to support the service. The central device 305B may accordingly cause itself to communicate with the peripheral device 307A to support the service. Additionally or alternatively, the status change of the central device 305C may cause the discovering of whether additional central devices in the surrounding area of the peripheral device 307A have become available to support the service of the peripheral device 307A. The peripheral device 307A may, for example, send (e.g., broadcast) an advertising message for discovering the additional central devices. If the additional central devices are discovered, each central device of the group of the central devices 305A-305B and the additional central devices may determine the priorities of the additional central devices for supporting the service of the peripheral device 307A, and may select, from the group of the central devices 305A-305B and the additional central devices and based on their respective priorities, a quantity (e.g., two) of central devices to be used to support the service of the peripheral device 307A.

Figure 7:
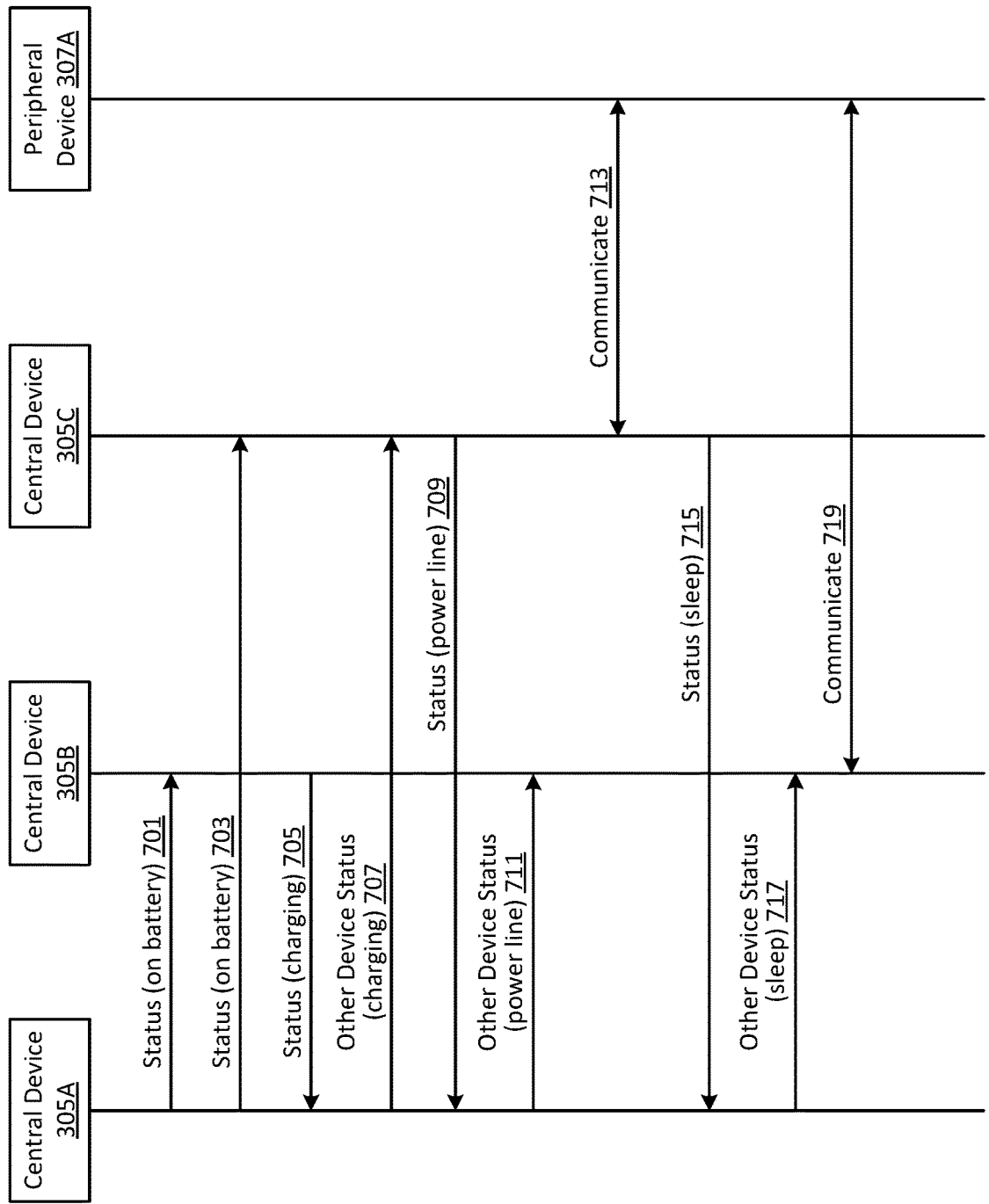
FIG. 7 is an event sequence showing an example method for prioritized usage of devices in which a central device determines priorities with message forwarding.

FIG. 7 is an event sequence showing an example method for prioritized usage of devices in which a central device determines priorities with message forwarding. While the steps of the event sequence are described in a particular order, the order of the steps may be altered without departing from the scope of the disclosure provided herein. Although the event sequence is described as being performed by a particular arrangement of computing systems, devices, and/ or networks (e.g., the central devices 305A-305C and/or the peripheral device 307A), the processes may be performed by a greater or smaller number of computing systems, devices, and/or networks, and/or by any type of computing system, device, and/or network.

In step 701, the central device 305A (e.g., a mobile phone powered by a battery without being connected to a charger) may send, to the central device 305B (e.g., a mobile phone powered by a battery and connected to a charger), an indication of a status of the central device 305A. In step 703, the central device 305A may send, to the central device 305C (e.g., a residential gateway powered by a power line), an indication of a status of the central device 305A. The indication of the status of the central device 305A may be, for example, that the central device 305A is powered by a battery without being connected to a charger.

In step 705, the central device 305B may send, to the central device 305A, an indication of a status of the central device 305B. The central devices 305B-305C might not be able to directly communicate with each other, for example, due to the long distance between the central devices 305B-305C exceeding their wireless communication ranges. Messages may be forwarded via an intermediate central device between two central devices unable to directly communicate with each other. For example, each central device of the central devices 305A-305C may be configured to forward (e.g., broadcast) a message received from another central device unless the central device has previously forwarded that particular message. Additionally or alternatively, each of the central devices 305A-305C may determine the identities of central devices capable of supporting the peripheral device 307A, for example, by receiving that identity information from the peripheral device 307A. And if a first central device determines that it is unable to directly communicate with a second central device, the first central device may request a third central device to forward a message from the first central device to the second central device. In step 707, the central device 305A may send, to the central device 305C, the status indication of the central device 305B. The indication of the status of the central device 305B may be, for example, that the central device 305B is powered by a battery and is connected to a charger.

In step 709, the central device 305C may send, to the central device 305A, an indication of a status of the central device 305C. In step 711, the central device 305A may send, to the central device 305B, an indication of a status of the central device 305C, as the central devices 305B-305C might be unable to directly communicate with each other. The indication of the status of the central device 305C may be, for example, that the central device 305C is powered by a power line. The central devices 305A-305C may send (e.g., broadcast) the status indications, for example, in response to receiving an advertising message from the peripheral device 307A (e.g., an electronic finder). Steps 701, 703, 705, 707, 709, 711 may be similar to and/or may comprise (and/or be comprised by) steps 401, 403 (FIG. 4A), step 439 (FIG. 4B), and/or step 461 (FIG. 4C).

Each central device of the central devices 305A-305C may, based on receiving the status indications of other central devices and based on the status indication of the central device itself, determine priorities of the central devices 305A-305C for supporting the peripheral device 307A. Each of the central devices 305A-305C may make an independent determination of the priorities. The determination of the priorities may be made, for example, in a similar manner as discussed in connection with FIG. 4C. For example, based on the central device 305A being powered by a battery without being connected to a charger, a priority rating of one (1) may be assigned to the central device 305A. Based on the central device 305B being powered by a battery and is connected to a charger, a priority rating of five (5) may be assigned to the central device 305B. Based on the central device 305C being powered by a power line, a priority rating of ten (10) may be assigned to the central device 305C. Additionally or alternatively, the priority rating of a central device of the central devices 305A-305C may be determined by the central device itself, and may be sent to other central devices.

Based on the service implemented by the peripheral device 307A, a quantity threshold corresponding to the number of central devices to be used for supporting the peripheral device 307A may be determined. For example, the peripheral device 307A may implement a service to determine a location of the peripheral device 307A based on determining that the peripheral device 307A is located within a communication range of a central device. It may be determined that one central device is to be used to support the service implemented on the peripheral device 307A. The central device 305C with the highest priority rating may be selected among the central devices 305A-305C. And the central device 305C may be used to support the service implemented on the peripheral device 307A.

Each of the central devices 305A-305C may instruct itself based on its own independent determination of the priorities of the central devices 305A-305C and the selection of the central device 305C. For example, the central device 305A may instruct itself to not support the service implemented on the peripheral device 307A. The central device 305B may instruct itself to not support the service implemented on the peripheral device 307A. The central device 305C may instruct itself to support the service implemented on the peripheral device 307A. The central device 305C may start to communicate with the peripheral device 307A in step 713. For example, the central device 305C may execute services or functions corresponding to the service implemented on the peripheral device 307A. Step 713 may be similar to and/or may comprise (and/or be comprised by) step 481 (FIG. 4C).

In step 715, the central device 305C may send, to the central device 305A, an indication of a change of the central device 305C from an active mode to a sleep mode. In step 717, the central device 305A may send, to the central device 305B, an indication of a change of the central device 305C from an active mode to a sleep mode, as the central devices 305B-305C might be unable to directly communicate with each other. The central device 305C may send (e.g., broadcast) the indication, for example, in response to the central device 305C being unplugged from a power outlet, or in response to a user instructing the central device 305C to turn into a sleep mode. The indication may suggest that the central device 305C might not be available to support the service of the peripheral device 307A. Steps 715, 717 may be similar to and/or may comprise (and/or be comprised by) steps 401, 403 (FIG. 4A), step 437 (FIG. 4B), and/or step 461 (FIG. 4C).

The central device 305C may determine to suspend supporting the service of the peripheral device 307A, as the central device 305C changes from an active mode to a sleep mode. Each of the central devices 305A-305B may, based on the status indication (sleep) of the central device 305C, determine a central device for supporting the service of the peripheral device 307A. For example, it may be determined (e.g., based on the previous status indications of the central devices 305A-305B) that the central device 305A has a priority rating of one (1), and that the central device 305B has a priority rating of five (5). Based on the central device 305B having a higher priority rating, each of the central devices 305A-305B may determine that the central device 305B may be used to support the service of the peripheral device 307A.

The central device 305C may instruct itself to suspend supporting the service of the peripheral device 307A. The central device 305A may, based on its determination of the priorities of the central devices 305A-305B, instruct itself to not support the service of the peripheral device 307A. The central device 305B may, based on its determination of the priorities of the central devices 305A-305B, instruct itself to activate supporting the service of the peripheral device 307A. In step 719, the central device 305B may start to communicate with the peripheral device 307A. For example, the central device 305B may execute services or functions corresponding to the service implemented on the peripheral device 307A. Step 719 may be similar to and/or may comprise (and/or be comprised by) step 481 (FIG. 4C).

Additionally or alternatively, the peripheral device 307A may implement a service for which two or more central devices are to be used to provide support. For such a service, each central device of the central devices 305A-305C may select, based on the priority ratings of the central devices 305A-305C and for supporting the service, two or more central devices of the central devices 305A-305C. For example, if the service of the peripheral device 307A is to be supported by two central devices, each central device of the central devices 305A-305C may select (e.g., after communicating the status indications in steps 701, 703, 705, 707, 709, 711) the central devices 305B-305C for supporting the service, based on determining that the priorities of the central devices 305B-305C are higher than the priority of the central device 305A. The central device 305A may accordingly cause itself to not support the service of the peripheral device 307A. The central device 305B may accordingly cause itself to communicate with the peripheral device 307A to support the service. The central device 305C may accordingly cause itself to communicate with the peripheral device 307A to support the service. In response to communicating (e.g., in steps 715, 717) an indication of a status change of the central device 305C from an active mode to a sleep mode, each central device of the central devices 305A-305C may determine that the central device 305C is not available to support the service of the peripheral device 307A. The central device 305C may suspend supporting the service of the peripheral device 307A, as the central device 305C changes from an active mode to a sleep mode. Each central device of the central devices 305A-305B may update the usage arrangement for the service of the peripheral device 307A, and may select, from the remaining central devices and based on their respective priorities, two central devices for supporting the service of the peripheral device 307A. For example, each central device of the central devices 305A-305B may select the remaining central devices 305A-305B for supporting the service. The central device 305A may accordingly cause itself to communicate with the peripheral device 307A to support the service. The central device 305B may accordingly cause itself to communicate with the peripheral device 307A to support the service. Additionally or alternatively, the status change of the central device 305C may cause the discovering of whether additional central devices in the surrounding area of the peripheral device 307A have become available to support the service of the peripheral device 307A. The peripheral device 307A may, for example, send (e.g., broadcast) an advertising message for discovering the additional central devices. If the additional central devices are discovered, each central device of the group of the central devices 305A-305B and the additional central devices may determine the priorities of the additional central devices for supporting the service of the peripheral device 307A, and may select, from the group of the central devices 305A-305B and the additional central devices and based on their respective priorities, a quantity (e.g., two) of central devices to be used to support the service of the peripheral device 307A.

Figure 8:
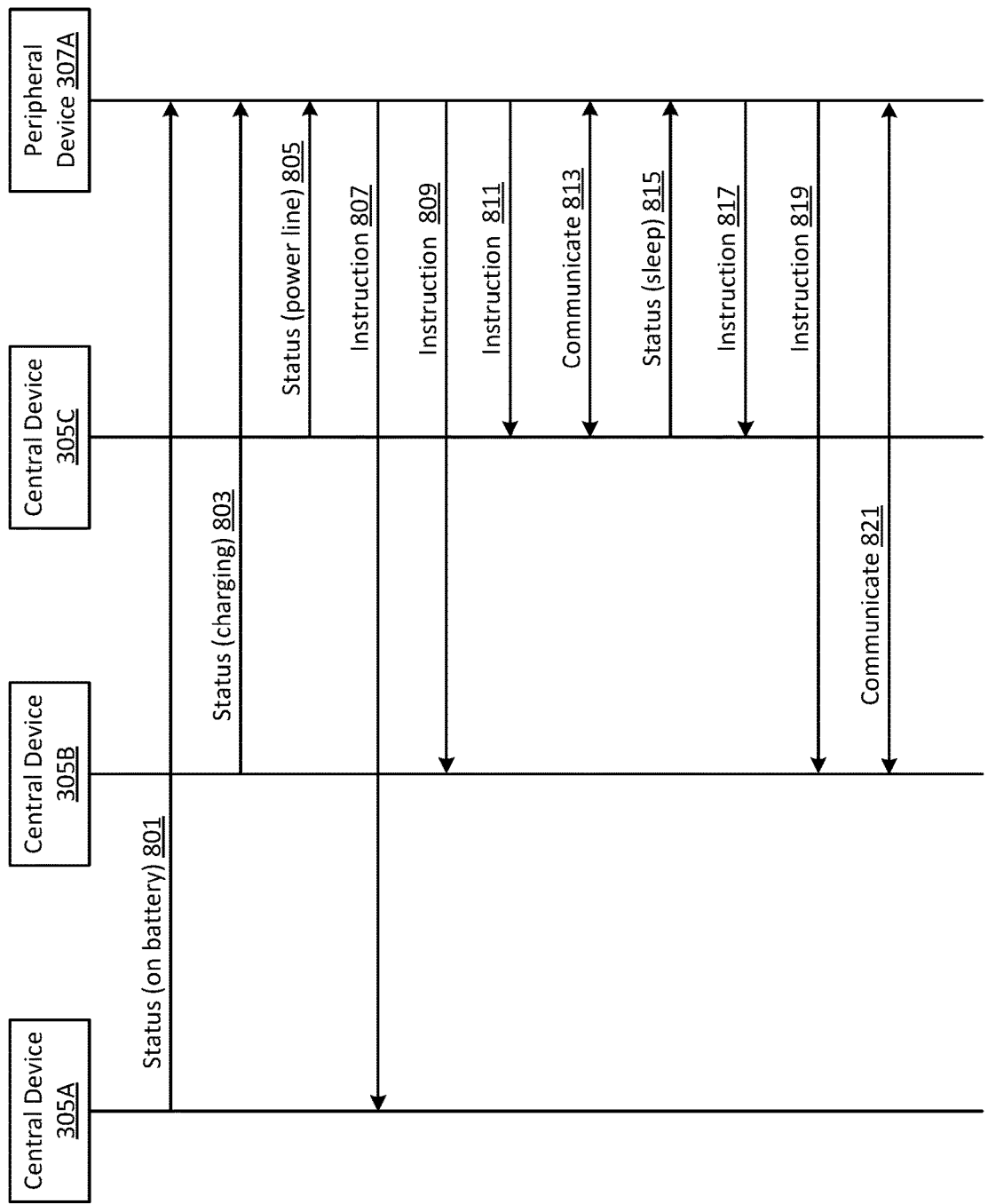
FIG. 8 is an event sequence showing an example method for prioritized usage of devices in which a peripheral device determines priorities.

FIG. 8 is an event sequence showing an example method for prioritized usage of devices in which a peripheral device determines priorities. While the steps of the event sequence are described in a particular order, the order of the steps may be altered without departing from the scope of the disclosure provided herein. Although the event sequence is described as being performed by a particular arrangement of computing systems, devices, and/or networks (e.g., the central devices 305A-305C and/or the peripheral device 307A), the processes may be performed by a greater or smaller number of computing systems, devices, and/or networks, and/or by any type of computing system, device, and/or network.

In step 801, the peripheral device 307A may receive, from the central device 305A (e.g., a mobile phone powered by a battery without being connected to a charger), an indication of a status of the central device 305A. The indication of the status of the central device 305A may be, for example, that the central device 305A is powered by a battery without being connected to a charger. In step 803, the peripheral device 307A may receive, from the central device 305B (e.g., a mobile phone powered by a battery and connected to a charger), an indication of a status of the central device 305B. The indication of the status of the central device 305B may be, for example, that the central device 305B is powered by a battery and is connected to a charger. In step 805, the peripheral device 307A may receive, from the central device 305C (e.g., a residential gateway powered by a power line), an indication of a status of the central device 305C. The indication of the status of the central device 305C may be, for example, that the central device 305C is powered by a power line. The central devices 305A-305C may send the status indications, for example, based on receiving an advertising message from the peripheral device 307A (e.g., an electronic finder). Steps 801, 803, 805 may be similar to and/or may comprise (and/or be comprised by) steps 401, 403 (FIG. 4A), step 439 (FIG. 4B), and/or step 461 (FIG. 4C).

The peripheral device 307A may, based on receiving the status indications, determine priorities of the central devices 305A-305C for supporting the peripheral device 307A. The determination of the priorities may be made, for example, in a similar manner as discussed in connection with FIG. 4C. For example, based on determining that the central device 305A is powered by a battery without being connected to a charger, the peripheral device 307A may assign a priority rating of one (1) to the central device 305A. Based on determining that the central device 305B is powered by a battery and is connected to a charger, the peripheral device 307A may assign a priority rating of five (5) to the central device 305B. Based on determining that the central device 305C is powered by a power line, the peripheral device 307A may assign a priority rating of ten (10) to the central device 305C. Additionally or alternatively, the priority rating of a central device of the central devices 305A-305C may be determined by the central device itself, and may be sent to the peripheral device 307A.

Based on the service implemented by the peripheral device 307A, the peripheral device 307A may determine a quantity threshold corresponding to the number of central devices to be used for supporting the peripheral device 307A. For example, the peripheral device 307A may implement a service to determine a location of the peripheral device 307A based on determining that the peripheral device 307A is located within a communication range of a central device. The peripheral device 307A may determine that one central device is to be used to support the service implemented on the peripheral device 307A. The peripheral device 307A may select the central device 305C with the highest priority rating, among the central devices 305A-305C. And the central device 305C may be used to support the service implemented on the peripheral device 307A.

Based on the determined priority ratings and the selection of the central device 305C, the peripheral device 307A may send instructions to the central devices 305A-305C. In step 807, the peripheral device 307A may send, to the central device 305A, an instruction to not support the service implemented on the peripheral device 307A. In step 809, the peripheral device 307A may send, to the central device 305B, an instruction to not support the service implemented on the peripheral device 307A. In step 811, the peripheral device 307A may send, to the central device 305C, an instruction to support the service implemented on the peripheral device 307A. Based on receiving the instruction from the peripheral device 307A, the central device 305C may start to communicate with the peripheral device 307A in step 813. For example, the central device 305C may execute services or functions corresponding to the service implemented on the peripheral device 307A. Steps 807, 809, 811, 813 may be similar to and/or may comprise (and/or be comprised by) step 481 (FIG. 4C).

In step 815, the central device 305C may send, to the peripheral device 307A, an indication of a change of the central device 305C from an active mode to a sleep mode (e.g., in response to the central device 305C being unplugged from a power outlet, or in response to a user instructing the central device 305C to turn into a sleep mode). The indication may suggest that the central device 305C might not be available to support the service of the peripheral device 307A. The peripheral device 307A may receive the indication from the central device 305C, and may determine another central device for supporting the service of the peripheral device 307A. For example, the peripheral device 307A may determine (e.g., based on the status indications previously received from the central devices 305A-305B in steps 801, 803) that the central device 305A has a priority rating of one (1), and that the central device 305B has a priority rating of five (5). Based on determining that the central device 305B has a higher priority rating, the peripheral device 307A may determine to use the central device 305B to support the service of the peripheral device 307A. Step 815 may be similar to and/or may comprise (and/or be comprised by) steps 401, 403 (FIG. 4A), step 437 (FIG. 4B), and/or step 461 (FIG. 4C).

Based on determining to use the central device 305B to support the service of the peripheral device 307A, the peripheral device 307A may send updated instructions to the central devices (e.g., 305B-305C). In step 817, the peripheral device 307A may send, to the central device 305C, an instruction to suspend supporting the service of the peripheral device 307A. The central device 305C may change to a sleep mode before or after receiving the instruction. In step 819, the peripheral device 307A may send, to the central device 305B, an instruction to activate supporting the service of the peripheral device 307A. Based on receiving the instruction from the peripheral device 307A, the central device 305B may start to communicate with the peripheral device 307A in step 821. For example, the central device 305B may execute services or functions corresponding to the service implemented on the peripheral device 307A. Steps 817, 819, 821 may be similar to and/or may comprise (and/or be comprised by) step 481 (FIG. 4C).

Additionally or alternatively, the peripheral device 307A may implement a service for which two or more central devices are to be used to provide support. For such a service, the peripheral device 307A may select, based on the priority ratings of the central devices 305A-305C and for supporting the service, two or more central devices of the central devices 305A-305C. For example, if the service of the peripheral device 307A is to be supported by two central devices, the peripheral device 307A may select (e.g., after receiving the status indications in steps 801, 803, 805) the central devices 305B-305C for supporting the service, based on determining that the priorities of the central devices 305B-305C are higher than the priority of the central device 305A. The peripheral device 307A may accordingly cause the central devices 305B-305C to communicate with the peripheral device 307A to support the service, and may cause the central device 305A to not support the service of the peripheral device 307A. In response to receiving (e.g., in step 815) an indication of a status change of the central device 305C from an active mode to a sleep mode, the peripheral device 307A may determine that the central device 305C is not available to support the service of the peripheral device 307A. The peripheral device 307A may update the usage arrangement for the service of the peripheral device 307A, and may select, from the remaining central devices and based on their respective priorities, two central devices for supporting the service of the peripheral device 307A. For example, the peripheral device 307A may select the remaining central devices 305A-305B for supporting the service. The peripheral device 307A may accordingly cause the central devices 305A-305B to communicate with the peripheral device 307A to support the service, and may cause the central device 305C to not support the service. Additionally or alternatively, the status change of the central device 305C may cause the peripheral device 307A to discover whether additional central devices in the surrounding area of the peripheral device 307A have become available to support the service of the peripheral device 307A. The peripheral device 307A may, for example, send (e.g., broadcast) an advertising message for discovering the additional central devices. If the additional central devices are discovered, the peripheral device 307A may determine the priorities of the additional central devices for supporting the service of the peripheral device 307A, and may select, from the group of the central devices 305A-305B and the additional central devices and based on their respective priorities, a quantity (e.g., two) of central devices to be used to support the service of the peripheral device 307A.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
comparing, by a computing device, a quantity of a plurality of central devices to a threshold quantity of central devices required to support a service usable to determine a location of a peripheral device;
based on a determination that the quantity satisfies the threshold quantity, determining, for each central device of the plurality of central devices and based on a type of an energy source of the central device, a priority rating;
identifying, from the plurality of central devices and based on the priority ratings for the plurality of central devices, one or more central devices to provide the service to determine the location of the peripheral device; and
causing the identified one or more central devices to:
receive, from the peripheral device, a first message comprising:
an advertisement of the peripheral device;
receive, from the peripheral device and after receiving the first message, a second message comprising:
a request for the one or more central devices to support one or more functions of the peripheral device, wherein at least one of the one or more functions is associated with the service usable to determine the location of the peripheral device;
determine a first location of the peripheral device based on the second message;
receive, from the peripheral device, after receiving the advertisement of the peripheral device, one or more third messages comprising communications for a different purpose than the advertisement of the peripheral device and the request for the one or more central devices to support the one or more functions of the peripheral device; and
determine a second location of the peripheral device based on the one or more third messages.

2. The method of claim 1, wherein a second function of the peripheral device comprises at least one of:
WiFi motion detection; or
camera object detection.

3. The method of claim 1, wherein the determining, for each central device of the plurality of central devices, the priority rating comprises:
determining an energy consumption required to support the service.

4. The method of claim 1, wherein the type of the energy source comprises one of:
a battery without being connected to a charger,
a battery connected to a charger, or
a power line.

5. The method of claim 1, wherein the determining, for each central device of the plurality of central devices, the priority rating is further based on one or more of:
a level of signal strength of signals between the central device and the peripheral device; or
a level of usage of computational resources of the central device.

6. The method of claim 1, wherein the determining, for each central device of the plurality of central devices, the priority rating comprises:
determining whether a level of signal strength of signals between the central device of the plurality of central devices and the peripheral device satisfies a threshold level of signal strength.

7. The method of claim 1, wherein the identifying the one or more central devices comprises:
ranking, based on the priority rating for each central device of the plurality of central devices, the plurality of central devices; and
identifying, based on the ranking, the one or more central devices.

8. The method of claim 1, further comprising:
causing at least one central device, of the plurality of central devices and other than the one or more central devices, to suspend support of the service usable to determine the location of the peripheral device.

9. The method of claim 1, wherein the causing the identified one or more central devices to determine the first location comprises determining a first current location of the peripheral device at a first time; and
wherein the causing the identified one or more central devices to determine the second location comprises determining a second current location of the peripheral device at a different time.

10. The method of claim 1, wherein the computing device comprises a central device of the plurality of central devices.

11. The method of claim 1, wherein the computing device comprises:
a server separate from the plurality of central devices and from the peripheral device; or
the peripheral device.

12. The method of claim 1, further comprising:
receiving, from the peripheral device, a request indicating an amount of a first computational resource needed to support the service; and
for each of the plurality of central devices, periodically:
receiving, from the central device, a usage rate of the first computational resource; and
adjusting, based on the usage rate and the amount of the first computational resource needed to support the service, a corresponding priority rating of the central device.

13. The method of claim 1, further comprising:
determining the threshold quantity based on a quantity of central devices necessary to determine the location of the peripheral device using a triangulation or multilateration technique.

14. The method of claim 1, further comprising:
causing the peripheral device to send, to the identified one or more central devices, data associated with wireless signals captured by the peripheral device; and
causing the identified one or more central devices to process the data to determine the first location of the peripheral device.

15. A method comprising:
determining, by a computing device, a plurality of central devices that are each capable of supporting a service usable to determine a location of a peripheral device;
based on determining that a first central device, of the plurality of central devices, is associated with a first energy source and that a second central device of the plurality of central devices is associated with a second energy source that is duration-limited, selecting, from the plurality of central devices, the first central device; and
based on the selecting the first central device:
causing the first central device to:
receive, from the peripheral device, a first message comprising:
an advertisement of the peripheral device;
receive, from the peripheral device and after receiving the first message, a second message comprising:
a request for one or more central devices to support one or more functions of the peripheral device, wherein at least one of the one or more functions is associated with the service usable to determine the location of the peripheral device;
determine a first location of the peripheral device based on the second message;
receive, from the peripheral device, after receiving the advertisement of the peripheral device, one or more third messages comprising communications for a different purpose than the advertisement of the peripheral device and the request for the one or more central devices to support the one or more functions of the peripheral device; and
determine a second location of the peripheral device based on the one or more third messages; and
causing the second central device to suspend support of the service.

16. The method of claim 15, wherein a second function of the peripheral device comprises at least one of:
WiFi motion detection; or
camera object detection.

17. The method of claim 15, wherein the selecting the first central device is further based on an energy consumption required to support the service.

18. The method of claim 15, wherein the causing the first central device to determine the first location comprises causing the first central device to determine a first current location of the peripheral device at a first time; and
wherein the causing the first central device to determine the second location comprises causing the first central device determine a second current location of the peripheral device at a different time.

19. The method of claim 15, wherein the first energy source comprises a power line, and wherein the second energy source comprises a battery.

20. A method comprising:
determining, by a first central device configured to provide a service usable to determine a location of an electronic tracking device, one or more additional central devices available to provide the service usable to determine the location of the electronic tracking device;
based on determining that a quantity of the one or more additional central devices satisfies a threshold quantity of central devices required to support the service, determining, for the first central device and based on a type of an energy source of the first central device, a priority rating; and
based on determining that the priority rating for the first central device is lower than one or more priority ratings for the one or more additional central devices, causing the one or more additional central devices to:
receive, from the electronic tracking device, a first message comprising:
an advertisement of the electronic tracking device;
receive, from the electronic tracking device and after receiving the first message, a second message comprising:
a request for the one or more central devices to support one or more functions of the electronic tracking device, wherein at least one of the one or more functions is associated with the service usable to determine the location of the electronic tracking device;
determine a first location of the electronic tracking device based on the second message;
receive, from the electronic tracking device, after receiving the advertisement of the electronic tracking device, one or more third messages comprising communications for a different purpose than the advertisement of the electronic tracking device and the request for the one or more central devices to support the one or more functions of the electronic tracking device; and
determine a second location of the electronic tracking device based on the one or more third messages.

21. The method of claim 20, wherein a second function of the electronic tracking device comprises at least one of:
WiFi motion detection; or
camera object detection.

22. The method of claim 20, further comprising:
causing the first central device to suspend support of the service.

23. The method of claim 20, wherein the type of the energy source of the first central device comprises one of:
a battery without being connected to a charger,
a battery connected to a charger, or
a power line.

* * * * *